(12) United States Patent
Setoue

(10) Patent No.: US 9,381,752 B2
(45) Date of Patent: Jul. 5, 2016

(54) INFORMATION PROCESSING APPARATUS AND LASER IRRADIATION APPARATUS

(71) Applicant: KYOCERA Document Solutions Inc., Osaka-shi, Osaka (JP)

(72) Inventor: Hiroshi Setoue, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/667,808

(22) Filed: Mar. 25, 2015

(65) Prior Publication Data

US 2015/0273861 A1  Oct. 1, 2015

(30) Foreign Application Priority Data

Mar. 28, 2014  (JP) ................. 2014-070581
Mar. 28, 2014  (JP) ................. 2014-070582
Mar. 28, 2014  (JP) ................. 2014-070583

(51) Int. Cl.
*B41J 2/44* (2006.01)
*G06K 15/02* (2006.01)
*G03G 15/00* (2006.01)

(52) U.S. Cl.
CPC ................ *B41J 2/442* (2013.01); *G03G 15/00* (2013.01); *G06K 15/02* (2013.01)

(58) Field of Classification Search
CPC ............. B41J 2/435; B41J 2/442; B41J 2/47; G06K 15/02; G06K 15/12; G03G 15/043
USPC ......... 347/224, 225, 232, 236, 237, 240, 246, 347/247, 251–254
See application file for complete search history.

(56) References Cited

U.S. PATENT DOCUMENTS

| | | | |
|---|---|---|---|
| 5,413,629 A | 5/1995 | Yasui et al. | |
| 5,719,372 A * | 2/1998 | Togari | B23K 26/0622 219/121.61 |
| 6,585,722 B1 * | 7/2003 | Abe | A61F 9/008 606/10 |
| 2003/0001946 A1 * | 1/2003 | Nomoto | H04N 1/4005 347/254 |
| 2014/0125752 A1 * | 5/2014 | Miyadera | G03G 15/0189 347/118 |

FOREIGN PATENT DOCUMENTS

| | | |
|---|---|---|
| JP | 5-42760 | 2/1993 |
| JP | 6-166266 | 6/1994 |

* cited by examiner

*Primary Examiner* — Stephen Meier
*Assistant Examiner* — John P Zimmermann
(74) *Attorney, Agent, or Firm* — Gerald E. Hespos; Michael J. Porco; Matthew T. Hespos

(57) ABSTRACT

An information processing apparatus includes a display unit, a storage unit, a display controller, an instruction receiver, and an instruction output unit. The storage unit stores coloring states of a laser irradiation target with respect to combinations of a plurality of conditions for laser irradiation, the coloring states being obtained when laser irradiation is executed under the conditions. The display controller causes the display unit to display the coloring states with respect to the combinations of the plurality of conditions. The instruction receiver receives, from an operator, a designation instruction for designating any of display portions of each of the coloring states displayed as for the display unit. The instruction output unit outputs, to the laser irradiation apparatus, a laser irradiation execution instruction for executing laser irradiation on the display portion, the designation instruction of which is received by the instruction receiver, in line with the plurality of conditions.

15 Claims, 29 Drawing Sheets

FIG.14
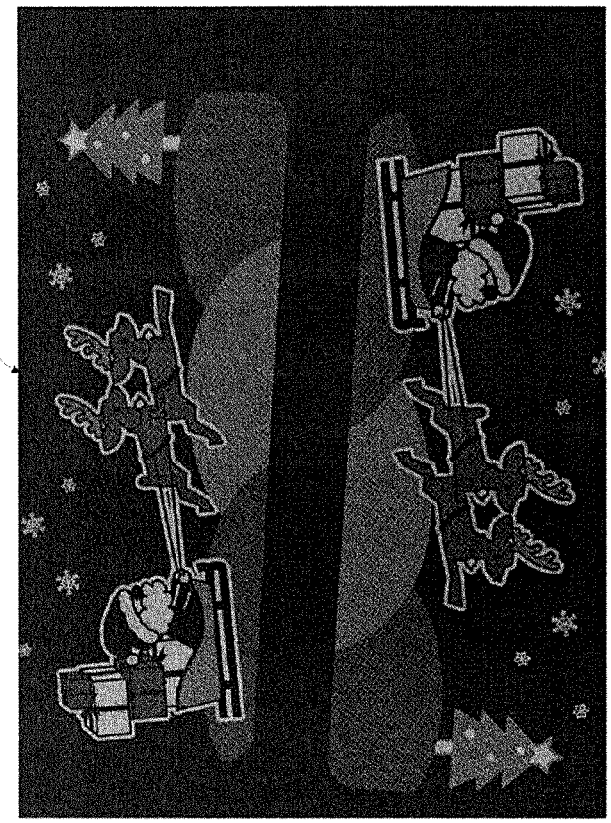
im05
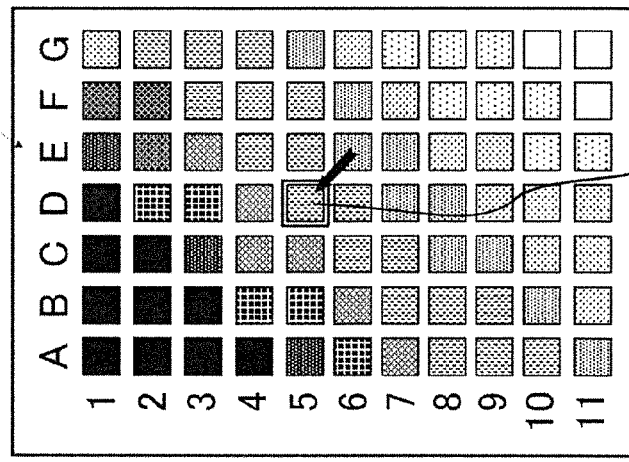
im03
im04

FIG.15
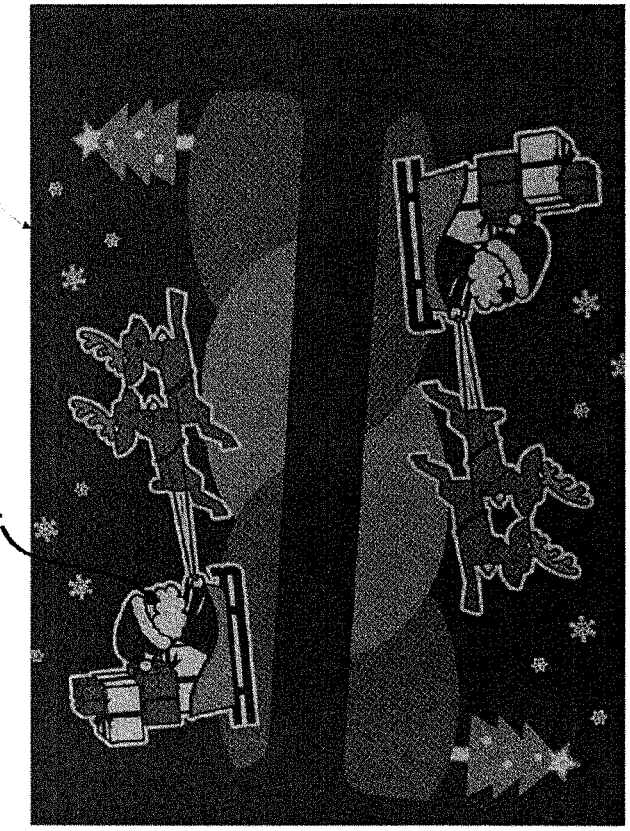
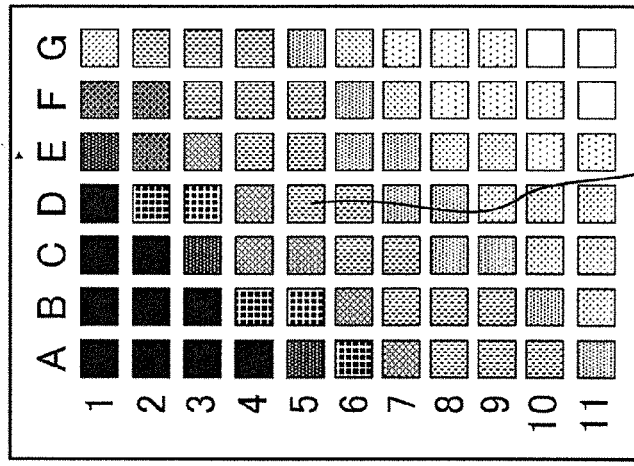

INFORMATION PROCESSING APPARATUS AND LASER IRRADIATION APPARATUS

INCORPORATION BY REFERENCE

This application is based on Japanese Patent Application No. 2014-70581, Japanese Patent Application No. 2014-70582, and Japanese Patent Application No. 2014-70583 filed on Mar. 28, 2014, the content of which is incorporated herein by reference.

TECHNICAL FIELD

The present disclosure relates to laser irradiation technology that is employed when printing an image on the surface of an irradiation target by irradiation of a laser beam.

The laser marking methods of high speed printing have been known in which a resin composition or the like is applied as a color coupler to the front surface of a printing target and this resin composition is irradiated with a laser. One of the laser marking methods enables high-contrast marking by irradiating a laser to a resin composition that contains a predetermined amount of potassium titanate. Another laser marking method irradiates a laser beam to a heat sensitive color developing printing area of a substrate on which a special printing ink is printed. The special printing ink is obtained by adding a substance such as water-soluble amino acids as a texture coloring preventive agent and borate salts as a sensitizer for laser marking to a printing ink that contains a basic leuco dye as a color coupler and an acidic substance as a developer.

SUMMARY OF THE INVENTION

An information processing apparatus according to one aspect of the present disclosure includes a display unit, a storage unit, a display controller, an instruction receiver, and an instruction output unit.

The storage unit stores, for each of combinations of a plurality of conditions for laser irradiation executed by a laser irradiation apparatus, coloring states of a laser irradiation target that are obtained when laser irradiation is executed under the conditions. The display controller causes the display unit to display the coloring states stored in the storage unit with respect to the combinations of the plurality of conditions. The instruction receiver receives from an operator a designation instruction for designating any of display portions of the coloring states displayed on the display unit. The instruction output unit outputs, to the laser irradiation apparatus, a laser irradiation execution instruction for causing the laser irradiation apparatus to execute laser irradiation as a laser irradiation execution instruction corresponding to the display portion, the designation instruction of which is received by the instruction receiver, in line with the plurality of conditions.

The information processing apparatus according to another aspect of the present disclosure includes an irradiation parameter storage unit and an irradiation instruction output unit.

The irradiation parameter storage unit stores a plurality of parameters with respect to a plurality of conditions for laser irradiation executed by a laser irradiation unit. The irradiation instruction output unit outputs, to the laser irradiation apparatus, an irradiation instruction for causing the laser irradiation unit to execute laser irradiation on a predetermined position on the irradiation target based on each of combinations of the plurality of parameters stored in the irradiation parameter storage unit.

A laser irradiation apparatus according to yet another aspect of the present disclosure includes the laser irradiation unit, an irradiation step storage unit, and a drive controller.

The irradiation step storage unit stores first combinations of a plurality of predetermined laser intensities and laser irradiation speeds used for laser irradiation by the laser irradiation unit, second combinations of a plurality of predetermined laser intensities and laser irradiation densities, or combinations of the first or second combinations and the number of laser irradiations executed by the laser irradiation unit. The drive controller causes the laser irradiation unit to execute laser irradiation on a predetermined position on the irradiation target with respect to each of the first or second combinations stored in the irradiation step storage unit or each of the first or second combinations stored by the number of laser irradiations.

BRIEF DESCRIPTION OF DRAWINGS

FIG. 14 is a diagram showing how the operator designates a desired image on the display shown in FIG. 13;

FIG. 15 is a diagram showing how the operator designates a desired portion on the display shown in FIG. 13;

DESCRIPTION OF EMBODIMENTS

An information processing apparatus and a laser irradiation apparatus according to each of the embodiments of the present disclosure are now described hereinafter with reference to the drawings.

First Embodiment

Figure 1:
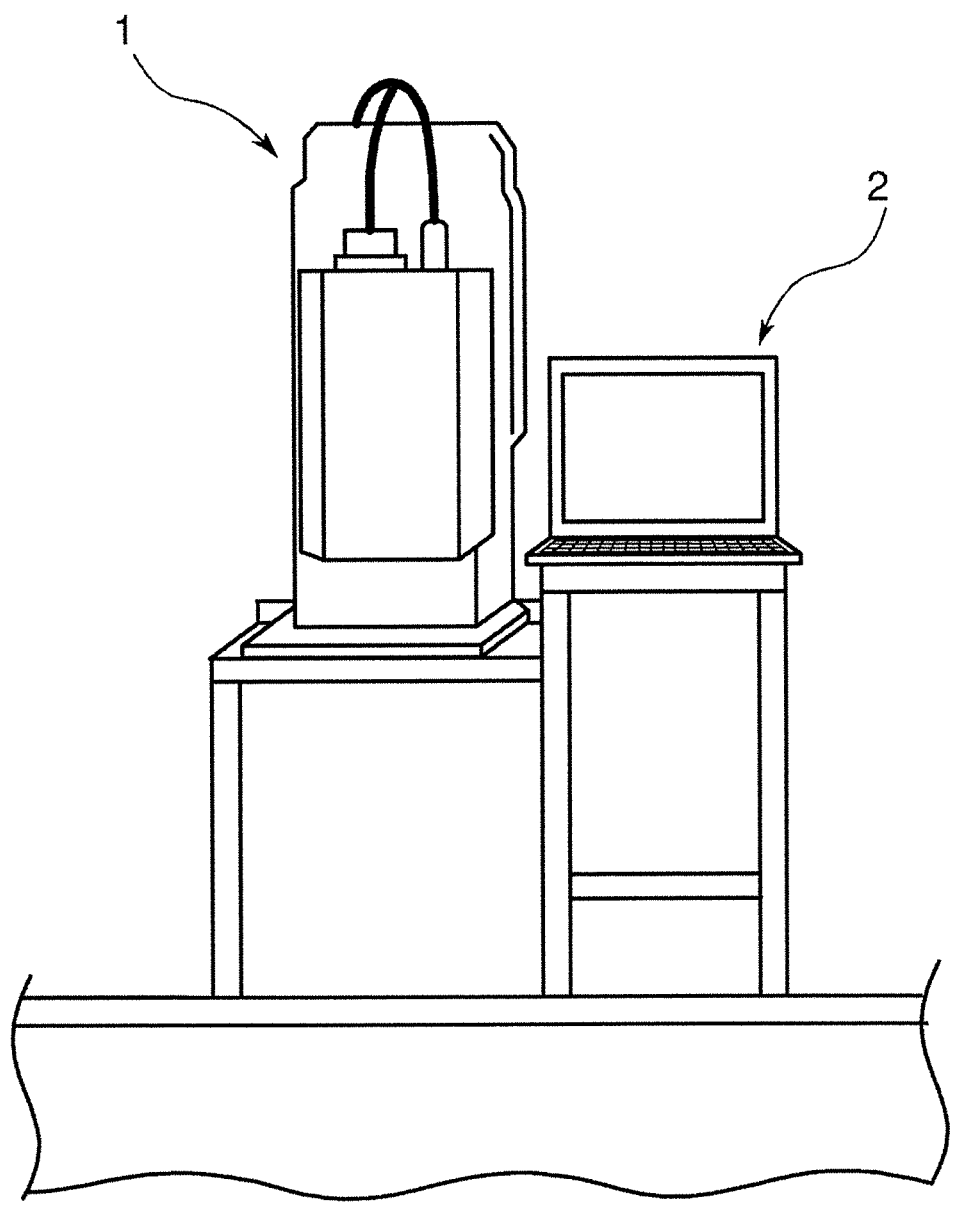
FIG. 1 is a diagram showing an information processing apparatus and a laser irradiation apparatus according to an embodiment of the present disclosure.

FIG. 1 is a diagram showing an information processing apparatus and a laser irradiation apparatus according to an embodiment of the present disclosure. A laser irradiation apparatus 1 causes a laser irradiation unit 12 (FIG. 27), described hereinafter, to irradiate an irradiation target such as a packaging material, a metal plate, or a synthetic resin plate (ABS, polycarbonate) with a laser in accordance with a laser irradiation instruction output from an information processing apparatus 2. The laser irradiation apparatus 1 performs laser marking to develop the colors of the inks on the front surface of the irradiation target by laser irradiation, thereby forming (printing) an image on the front surface of the irradiation target.

The information processing apparatus 2 is connected to the laser irradiation apparatus 1 in such a manner as to be able to communicate data therewith, and outputs a laser irradiation instruction to the laser irradiation apparatus 1. The information processing apparatus 2 stores a laser irradiation driving program. In the first embodiment, laser intensities and laser irradiation densities are selected as a plurality of conditions for laser irradiation. Therefore, the laser irradiation driving program of the first embodiment is a program for defining the intensities and irradiation densities of laser irradiation executed by the laser irradiation unit 12 in order to drive the laser irradiation unit 12 at the defined laser intensities and irradiation densities. In other words, the laser irradiation driving program is a program for creating an instruction for controlling the drive of laser irradiation and transmitting the instruction to the laser irradiation apparatus 1.

Figure 2:
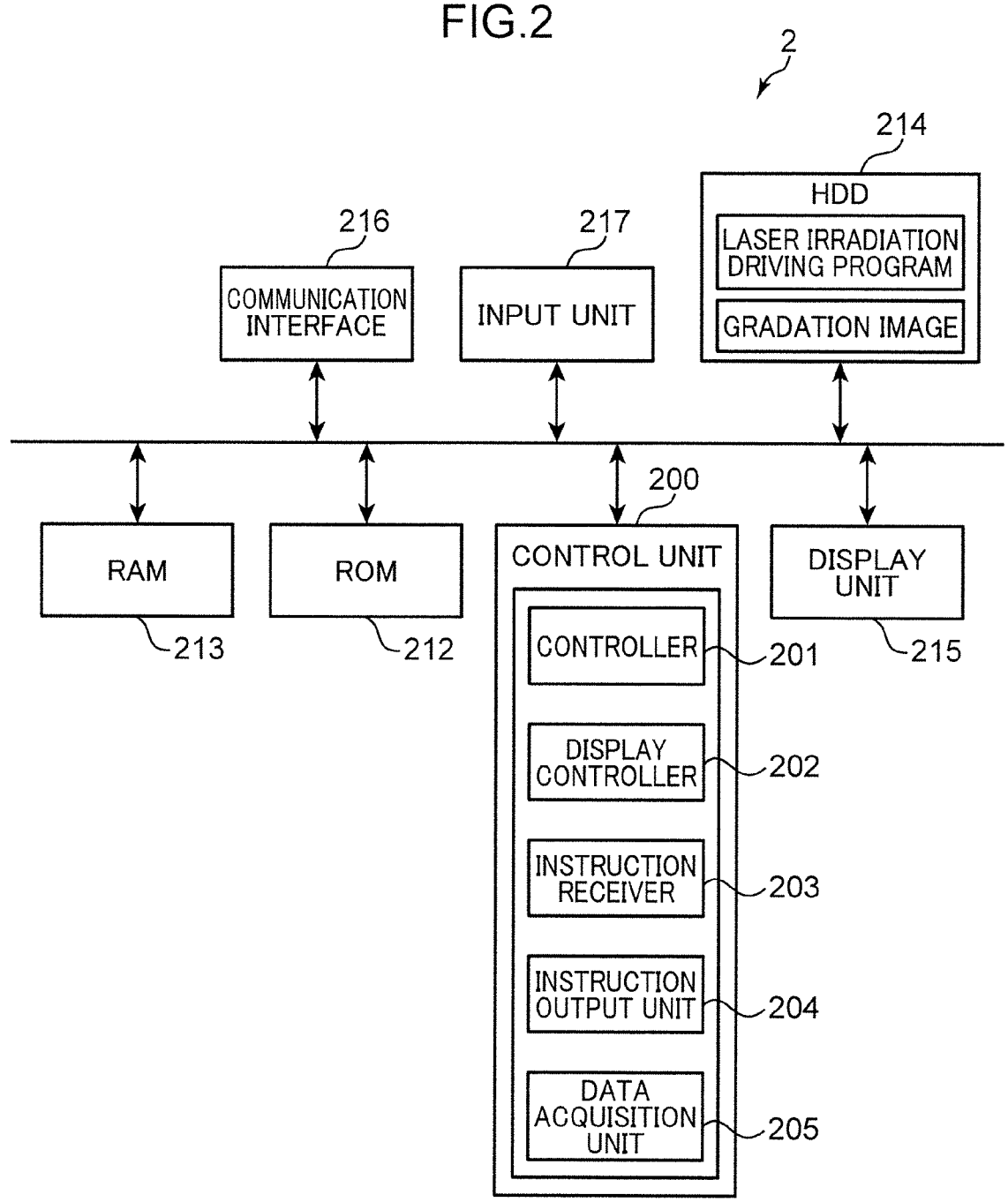
FIG. 2 is a block diagram schematically showing an internal configuration of the information processing apparatus according to a first embodiment.

A configuration of the information processing apparatus 2 is described next. FIG. 2 is a block diagram schematically showing an internal configuration of the information processing apparatus 2 according to the first embodiment. The information processing apparatus 2 has a control unit 200, a ROM 212, a RAM 213, a Hard Disk Drive (HDD) 214, a display unit 215, a communication interface 216, and an input unit 217. These parts are capable of transmitting and receiving data or signals to and from one another through a CPU bus.

The control unit 200 is configured with a CPU and the like. The ROM 212 stores an operation program for a basic operation of the information processing apparatus 2. The RAM 213 is used as an operation area or the like of the control unit 200.

The HDD (the storage unit/irradiation parameter storage unit) 214 is a storage medium for storing various data and programs. The laser irradiation driving program described above is stored in the HDD 214. In the HDD 214 of the first embodiment is stored, for each of the combinations of laser intensities and laser irradiation densities, an image (a gradation image, described hereinafter) consisting of a group of images showing coloring states of a laser irradiation target that are obtained when laser irradiation is performed at the laser intensities and laser irradiation densities.

The control unit 200 functions as a controller 201, a display controller 202, an instruction receiver 203, an instruction output unit 204, and a data acquisition unit 205 by being operated in accordance with the laser irradiation driving program. However, the controller 201, display controller 202, instruction receiver 203, instruction output unit 204, and data acquisition unit 205 of the control unit 200 may each be configured with a hard circuit whether being operated by the control unit 200 based on the laser irradiation driving program or not.

The display unit 215 is configured with a liquid crystal display (LCD) or the like. The display unit 215 artificially displays an image formation result of laser marking which is executed by laser irradiation by the laser irradiation apparatus 1 at a plurality of laser intensities and laser irradiation densities.

The communication interface 216 functions as an interface for communicating data with the laser irradiation apparatus 1, a computer, a scanner, or the like. The input unit 217, configured with a keyboard, a mouse pointer or the like, receives various operation instructions from an operator.

The controller 201 of the control unit 200 is in charge of controlling the overall operation of the information processing apparatus 2. The display controller 202 is in charge of controlling display provided by the display unit 215. The display controller 202 displays, with respect to the combinations of laser intensities and laser irradiation densities, images and the like showing coloring states of the laser irradiation target stored in the HDD 214.

The instruction receiver 203 receives designation instructions for designating display portions of the images showing the coloring states displayed on the display unit 215, a laser irradiation execution instruction, and the like from the operator. Each of these instructions is input by the operator operating the input unit 217.

The instruction output unit 204 (the irradiation instruction output unit) creates a laser irradiation execution instruction (the irradiation instruction) in accordance with the laser intensities and laser irradiation densities (the plurality of conditions/plurality of parameters) corresponding to the display portion, the designation of which is received by the instruction receiver 203, and then outputs the created laser irradiation execution instruction to the laser irradiation apparatus 1.

Figure 3:
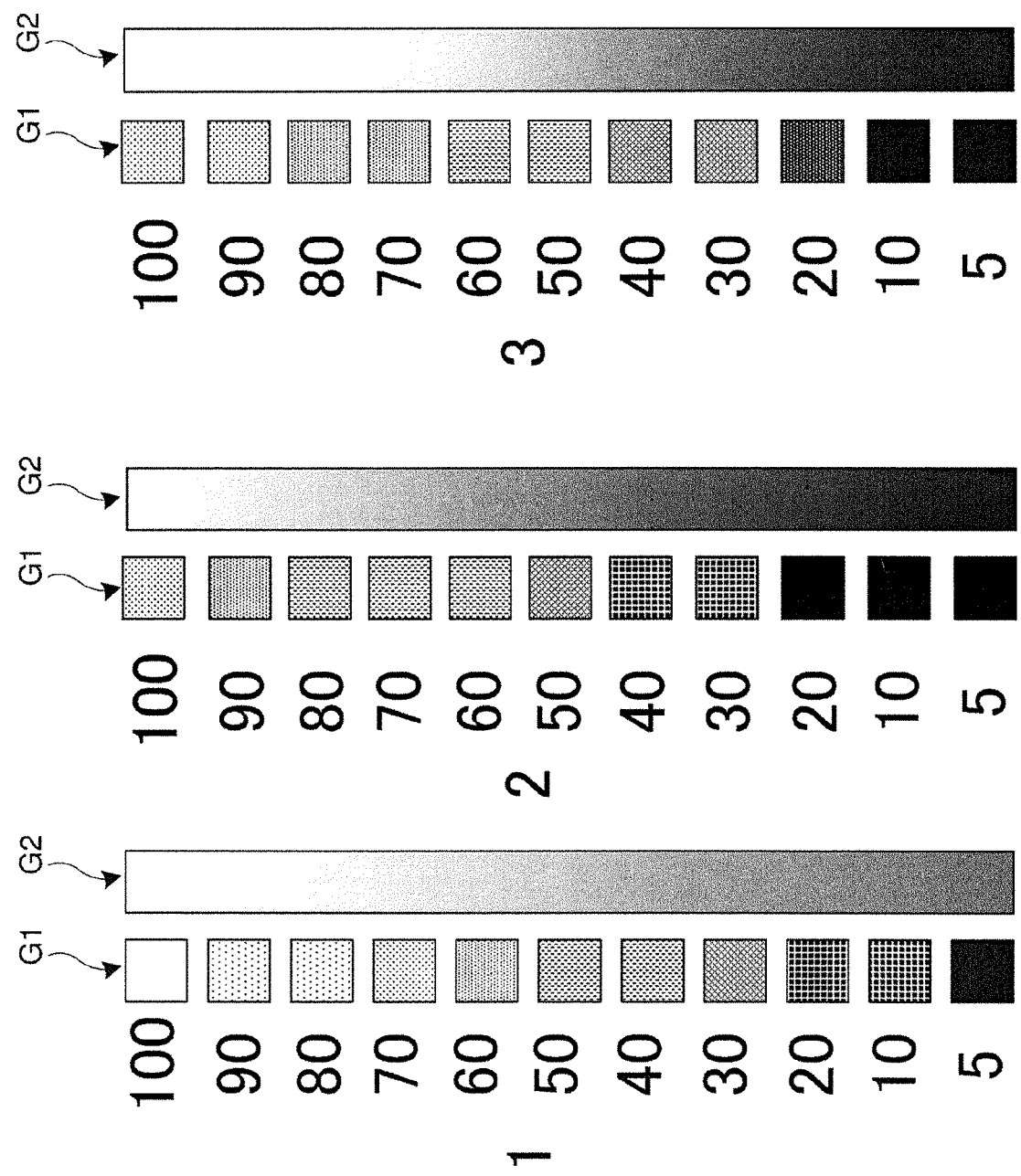
FIG. 3 is a diagram showing an example of images showing coloring states of each of combinations of laser intensities and laser irradiation densities.

FIG. 3 shows images with gradations, having arrays of images showing, with respect to each of the different laser intensities, coloring states obtained by laser irradiations executed at different laser irradiation densities. In the HDD 214 are stored such gradation images, in each of which the coloring states corresponding to the combinations of laser intensities and laser irradiation densities are arranged based on the laser irradiation intensities, with respect to the different gradual laser irradiation densities, as shown in the example in FIG. 3. FIG. 3 shows gradation images G1, in each of which eleven stages of laser irradiation densities, 5, 10, 20, 30, 40, 50, 60, 70, 80, 90, and 100, are arranged in this order, the laser irradiation densities falling within a range of 5 to 10 in the range that can be set by the laser irradiation apparatus 1. Next to the images G1 is a strip of gradation-like image G2 that shows a coloring state that is obtained as a result of laser irradiation executed by converting the laser densities from 0 to 100 with no regard to the stages in the range that can be set by the laser irradiation apparatus 1. Images comprising a pair of the gradation images G1 and G2 are shown along with images "1," "2" and "3" representing the levels of laser intensities.

For example, the operator operates the input unit 217 to input the gradation images to the information processing apparatus 2 through the communication interface 216 by using a computer or a scanner. The controller 201 acquires the gradation images and stores them in the HDD 214. The display controller 202 causes the display unit 215 to display the gradation images stored in the HDD 214 such as those shown in FIG. 3, i.e., the gradation images that have the gradual different laser irradiation densities arranged on the basis of the laser intensities.

While the display unit 215 displays the gradation images, the operator operates the mouse pointer functioning as the input unit 217, to designate an image portion showing a desired coloring state. The instruction receiver 203 takes this designation by the operator as a designation of a laser intensity and laser irradiation density associated with an image showing the coloring state in the designated portion. The instruction output unit 204 outputs, to the laser irradiation apparatus 1, a laser irradiation execution instruction for executing laser irradiation at the laser intensity and laser irradiation density, the designation of which is received by the instruction receiver 203.

The data acquisition unit 205 acquires image data as printing target data from the laser irradiation apparatus 1, computer, scanner or the like through the communication interface 216. The printing target data acquired by the data acquisition unit 205 are in the form of images composed of, for example, drawing data created with a drawing application such as Illustrator™, drawing data created with a CAD application, character data created with an application capable of inputting characters, such as a word processor, image data such as JPEG or BMP, and the like. The printing target data are composed of, for example, vector data, raster data, a combination thereof, or the like. However, these are merely examples of the printing target data and are not intended to limit the printing target data thereto. Note that the instruction receiver 203 is capable of receiving a designation instruction for designating a position on an image represented by the printing target image data acquired by the data acquisition unit 305 as a laser irradiation position on which laser irradiation is executed by the laser irradiation apparatus 1.

Next is described a laser irradiation instruction receiving process executed by the information processing apparatus 2.

Figure 4:
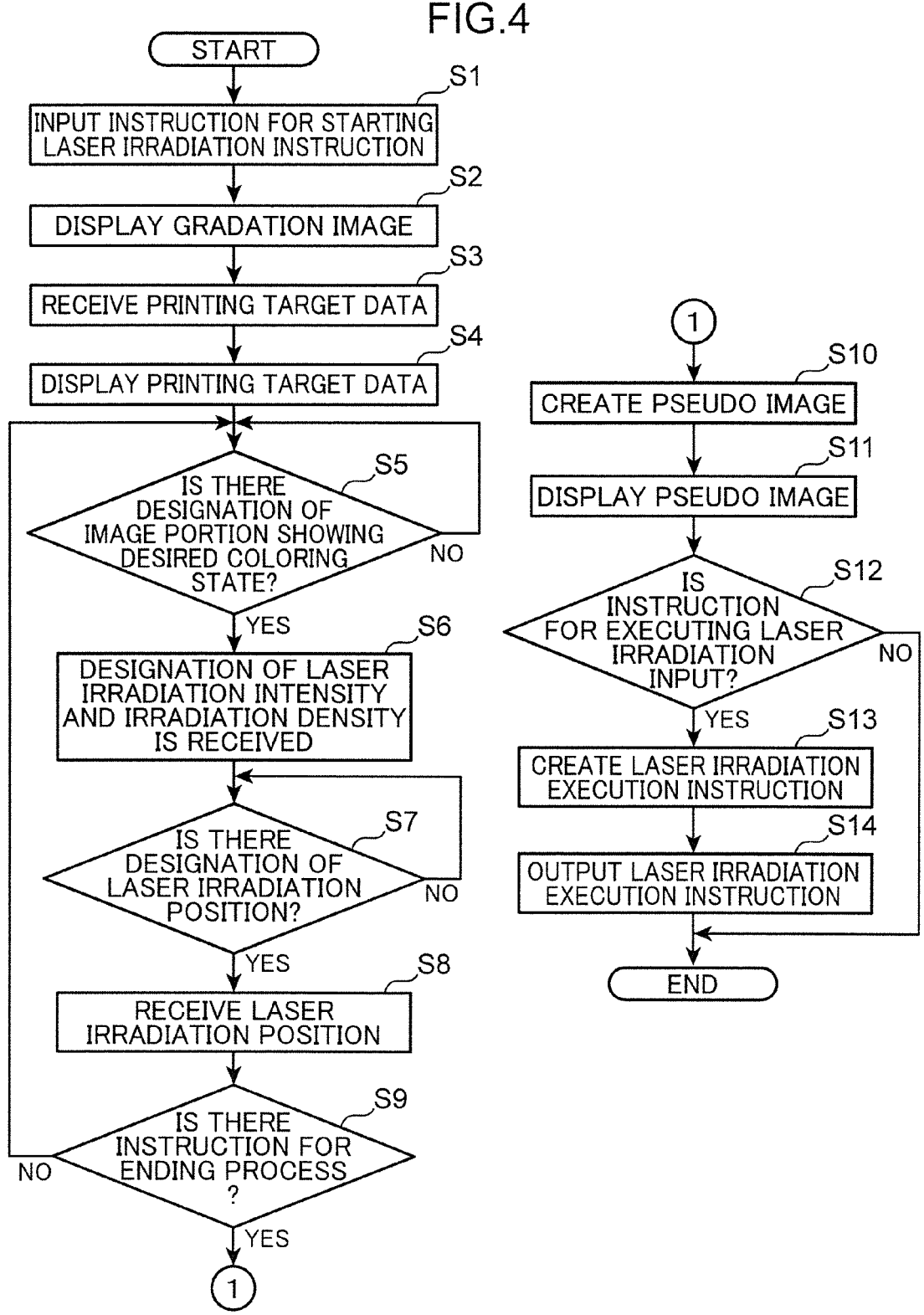
FIG. 4 is a flowchart showing a laser irradiation instruction receiving process executed by the information processing apparatus according to the first embodiment.

FIG. 4 is a flowchart showing a laser irradiation instruction receiving process executed by the information processing apparatus 2 according to the first embodiment. Let it assume that an image that shows a coloring state corresponding to each combination of a laser intensity and a laser irradiation density is stored in the HDD 214 beforehand by the operator.

When the operator operates the input unit 217 to input an instruction for starting a laser irradiation instruction (S1), the display controller 202 reads the images showing the coloring states from the HDD 214 and displays these images on the display unit 215 (S2).

Figure 5:
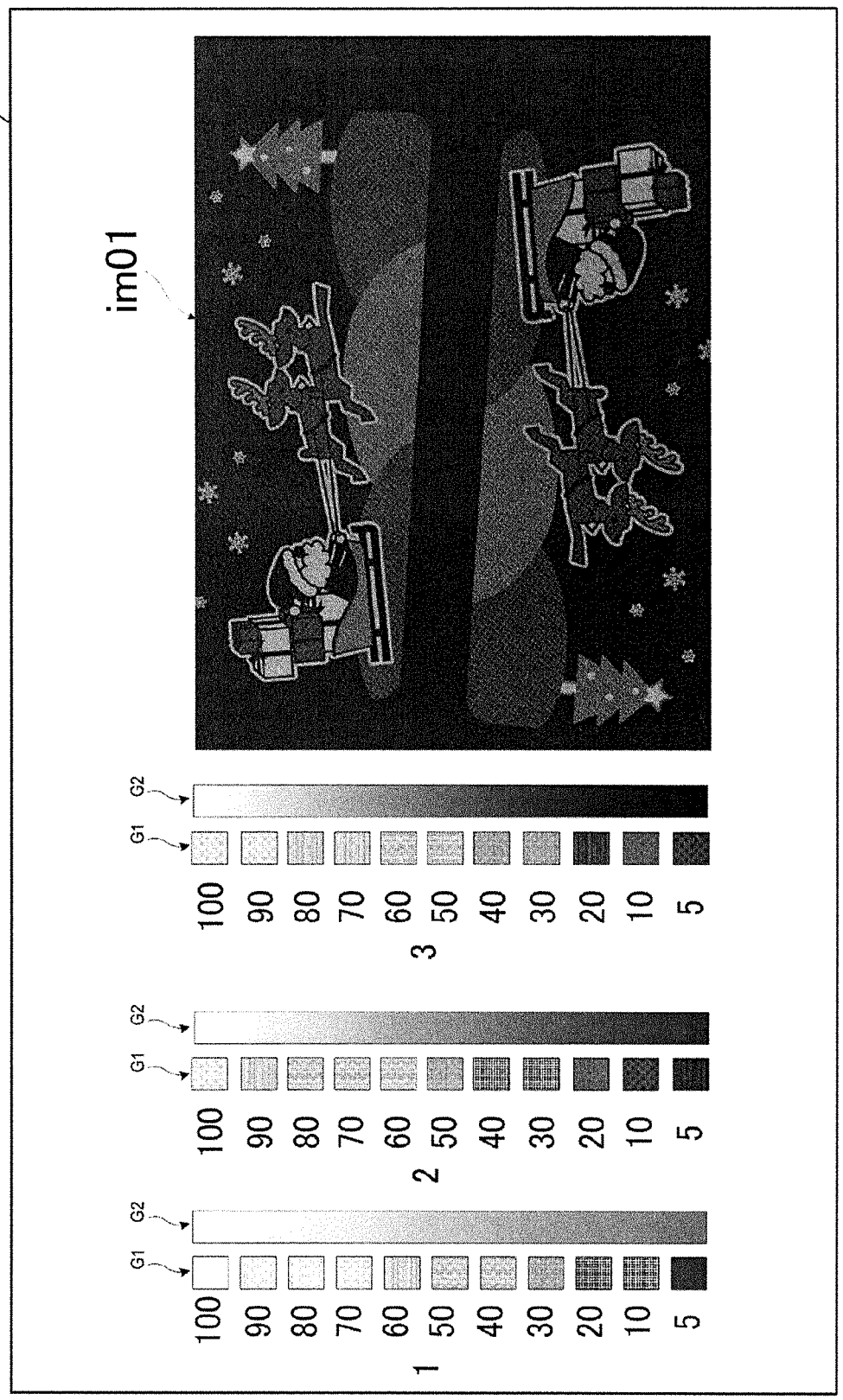
FIG. 5 is a diagram showing how the images showing the coloring states and an image showing printing target data are displayed on a display unit according to the first embodiment.

Subsequently, when the data acquisition unit 205 receives the printing target data based on a further operation on the input unit 217 executed by the operator (S3), the display controller 202 displays an image im01, shown by the printing target data, on the display unit 215, as shown in the example in FIG. 5 (S4). It should be noted that steps S3 and S4 may be executed prior to step S2.

For example, this embodiment employs an image in which each of specific images is drawn at a predetermined position, the specific images showing coloring states that are obtained through a series of laser irradiations with the combinations of laser intensities and laser irradiation densities. For instance, the gradation images shown in FIG. 3 are employed. In these gradation images, images showing coloring states that are obtained through laser irradiation with the combinations of laser intensities and laser irradiation densities are arranged with respect to gradually different laser irradiation densities on the basis of the laser irradiation intensities.

The instruction output unit 204 stores the laser intensities and laser irradiation densities associated with these images or portions contained in the gradation images, with respect to these images or portions. For instance, the each position of each specific image of the images G1 in the predetermined gradation images is already defined. Thus, a laser intensity and a laser irradiation density corresponding to each of the areas representing the positions of the images G1 in the gradation images are stored in the instruction output unit 204 beforehand. With regard to the gradation-like images G2 as well, a laser intensity and a laser irradiation density corresponding to each of the different positions in the long direction of each gradation-like image G2 are stored in the instruction output unit 204 beforehand.

Let it assume that while the gradation images are displayed on the display unit 215, the operator operates the input unit 217 to designate a part of the areas in the gradation images and thereby input the corresponding laser intensity and laser irradiation density. In this case, the instruction output unit 204 may store the input laser intensity and laser irradiation density in correspondence with the image displayed in the designated part of the areas (any of the images G1 in the gradation image). In this manner, the operator can set laser intensities and laser irradiation densities in accordance with the performance of the laser irradiation apparatus.

Figure 6:
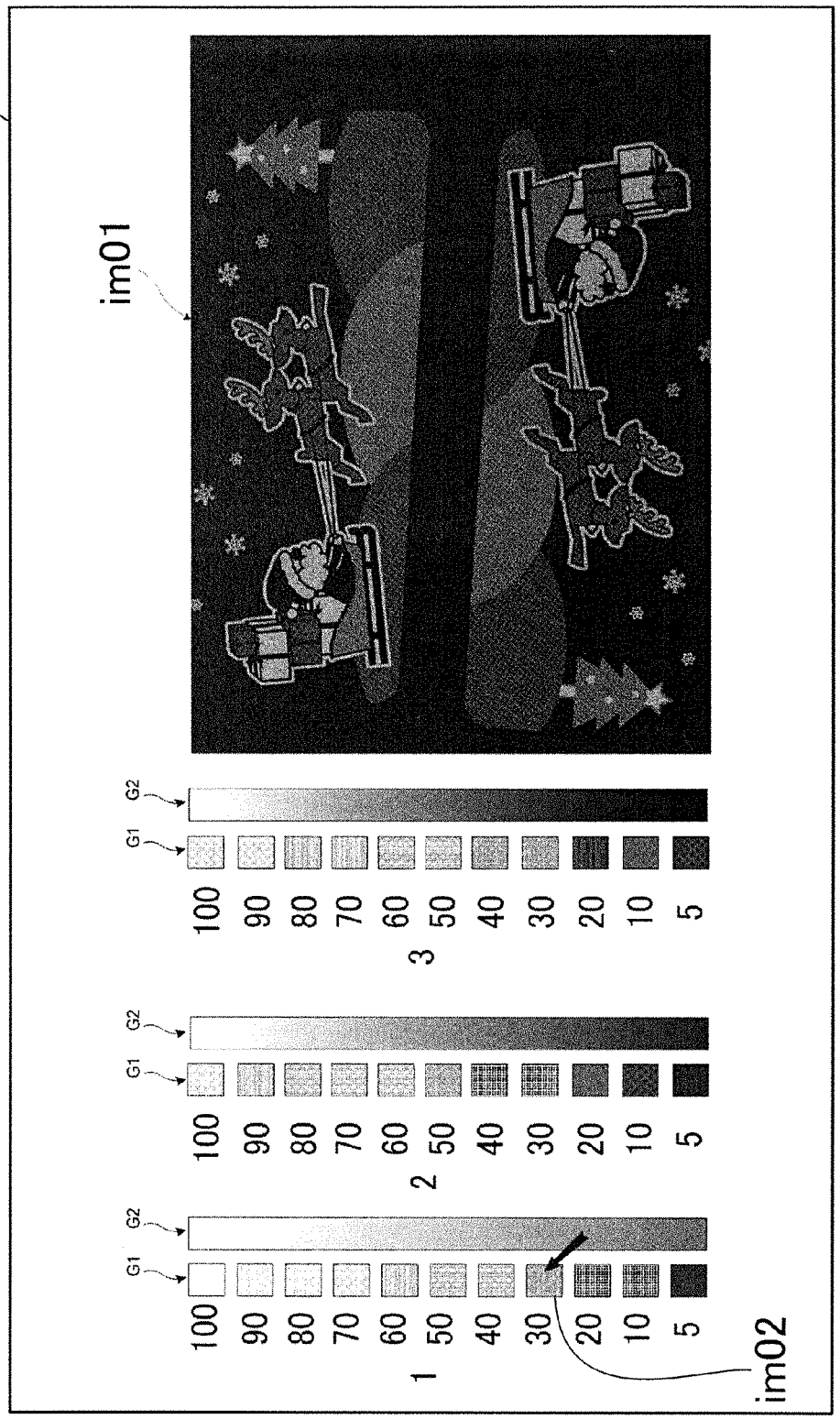
FIG. 6 is a diagram showing how an operator designates a desired image on the display shown in FIG. 5.

Let it assume that, as described above, while the display controller 202 displays the printing target data on the display unit 215 (S4), the operator operates, as shown in an example in FIG. 6, the mouse pointer functioning as the input unit 217, to designate a display area corresponding to an image portion im02 showing a desired coloring state, from among the display areas of the gradation images G1 showing the coloring states displayed on the display unit 215 (YES in S5). In this case, the instruction receiver 203 receives a designation of a laser intensity and laser irradiation density associated with the image in the coloring state displayed by the image portion im02 (S6).

Note that by operating the input unit 217, the operator can designate a display area for image portion showing coloring states by using any of the gradation images G1 having different laser intensities. By causing the instruction receiver 203 to receive such designations and causing the instruction output unit 204 to output laser irradiation execution instructions to the laser irradiation apparatus 1, the laser irradiation apparatus 1 can execute laser irradiation while changing the laser intensities and laser irradiation densities in order to form an image by means of laser marking based on a single printing data.

Figure 7:
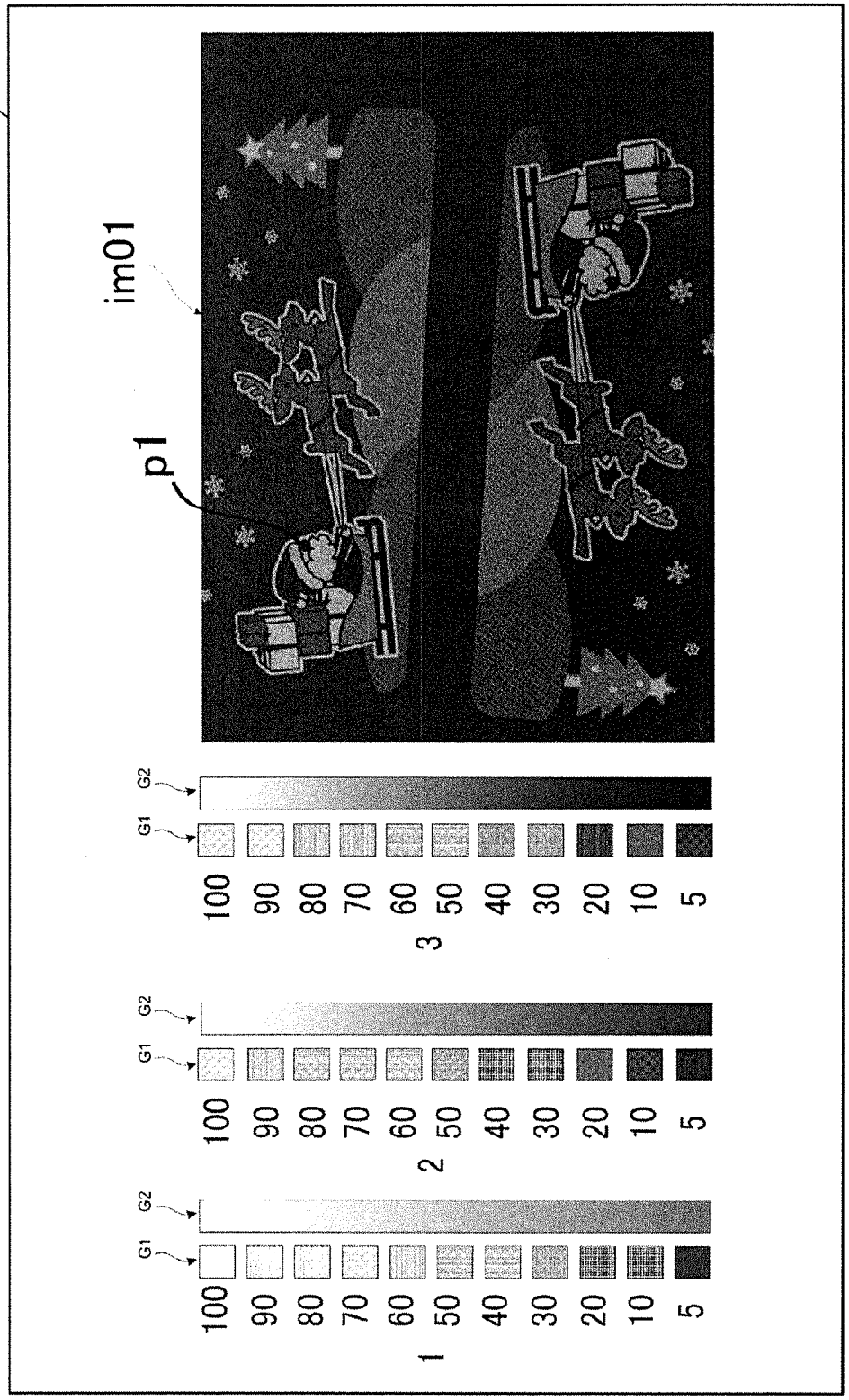
FIG. 7 is a diagram showing how the operator designates a desired portion on the display shown in FIG. 5.

As shown in the example in FIG. 7, the operator further operates the mouse pointer to designate, on the image im01 represented by the printing target data displayed on the display unit 215, a position p1 on which laser irradiation is executed at the laser intensity and laser irradiation density received in step S6 (YES in S7). The instruction receiver 203 takes the designation of the position p1 as a place to execute laser irradiation at the laser intensity and laser irradiation density received in step S6 (S8).

Here, the operator can operate the input unit 217 to designate the entire image im01 represented by the printing target data as the place to execute laser irradiation at the laser intensity and laser irradiation density received in step S6.

When the operator operates the input unit 217 and designates the image of the coloring state displayed by the image portion im02 from among a plurality of continuous portions on the image im01 such that the laser irradiation density changes gradually, then the inclinations of the gradations formed by laser irradiation can be changed.

Subsequently, steps S5 to S8 are continuously executed until the operator operates the input unit 217 to input an instruction for ending the process of designating a laser irradiation position where laser irradiation is executed at the laser irradiation intensity and laser irradiation density (NO in S9).

When the operator inputs an instruction for ending the process of designating a laser irradiation position where laser irradiation is executed at the laser irradiation intensity and laser irradiation density (YES in S9), the display controller 202 determines the coloring states associated with the laser intensities and laser irradiation densities for the respective places (on the image shown by the printing target data) that have already been received in step S8. Using the images showing the coloring states, the display controller 202 also creates pseudo images showing coloring states that are expected to be obtained after laser irradiation is executed on the irradiation target (S10). The display controller 202 displays the created pseudo images on the display unit 215 (S11). For example, in step S10, the display controller 202 creates the pseudo images by using the data of the images, showing the coloring states—part of the gradation images—and stored in the HDD 214. With these pseudo images displayed, the operator can accurately predict a resultant image created with the coloring states that are set for the respective places of the printing target data, as described above.

Let it assume that, after the pseudo images are displayed, the operator operates the input unit 217 to input an instruction for executing laser irradiation on the respective places that have been received, at the laser intensities and laser irradiation densities (YES in S12). In this case, the instruction output unit 204 creates a laser irradiation execution instruction for executing laser irradiation on the respective places at the designated laser intensities and laser irradiation densities (S13). The instruction output unit 204 outputs the created laser irradiation execution instruction to the laser irradiation apparatus 1 through the communication interface 216 (S14).

Upon reception of the instruction, the laser irradiation apparatus 1 causes a controller 101 (FIG. 27) to control the drive of the laser irradiation unit in accordance with the instruction, to execute laser irradiation on the laser irradiation target.

According to this embodiment, at the time of laser marking image formation, the results of the image formation can be made predictable prior to the execution of laser irradiation on the laser irradiation target, thereby obtaining an image formation result close to a desired result of a user. In addition, the instruction receiver 203 receives designations of coloring states from the operator based on the gradation images as described above, enabling the operator to easily check a plurality of coloring states and easily select a desired coloring state.

In the foregoing embodiment, the instruction receiver 203 receives a designation instruction that indicates that a position designated by the operator from the image shown by the image data acquired by the data acquisition unit 205 is a laser irradiation position. Such configuration can easily set how to develop the color of the position in the image represented by the printing target data.

Figure 8:
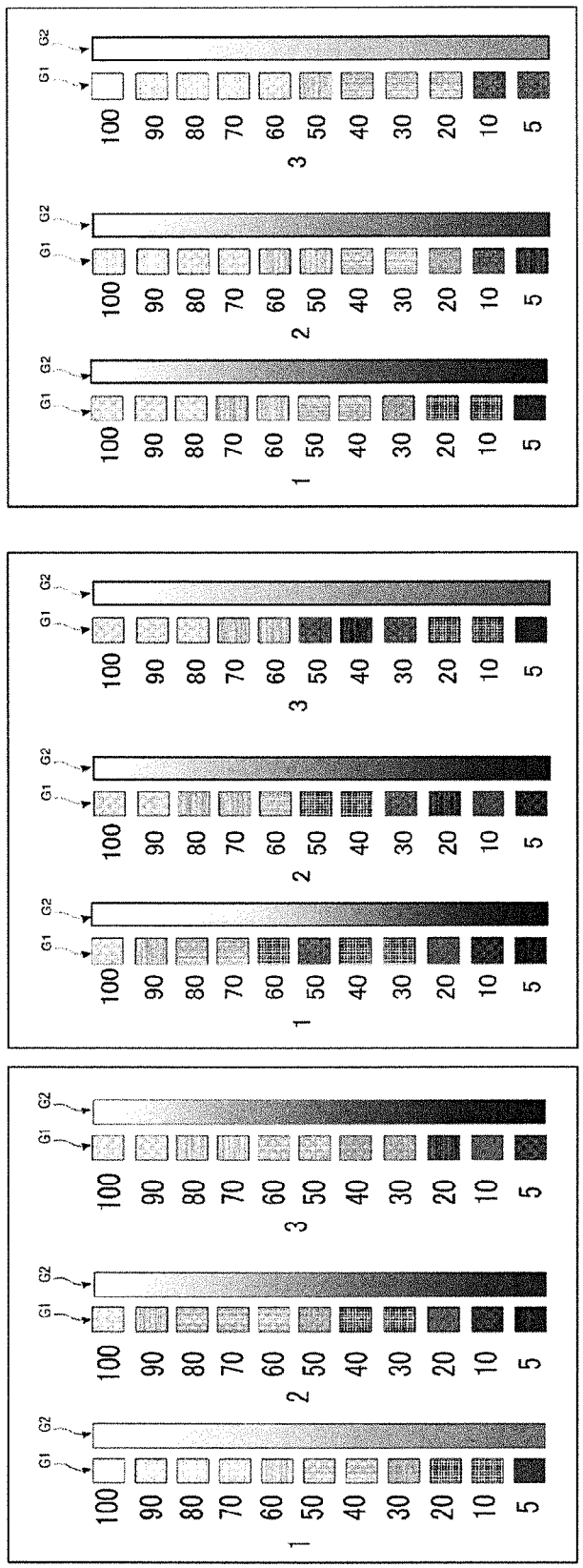
FIG. 8 is a diagram showing another example of the images showing the coloring states in the form of gradation images.

Another example of the gradation images stored in the HDD 214 is described next. FIG. 8 is a diagram showing another example of the gradation images. The above has described an example of using the gradation images composed of images showing coloring states corresponding to the laser intensities and laser irradiation densities; however, the present disclosure is not limited to this configuration. For instance, the gradation images may be prepared in accordance with printing inks to be radiated or the material of the laser irradiation target, and then these prepared gradation images may be stored in the HDD 214. FIG. 8 shows gradation images for three materials 1, 2 and 3. In this case, the operator operates the input unit 217 to select one or more of the gradation images corresponding to desired materials, and the selected gradation image/s is/are used for the laser irradiation instruction receiving process described above.

Figure 9:
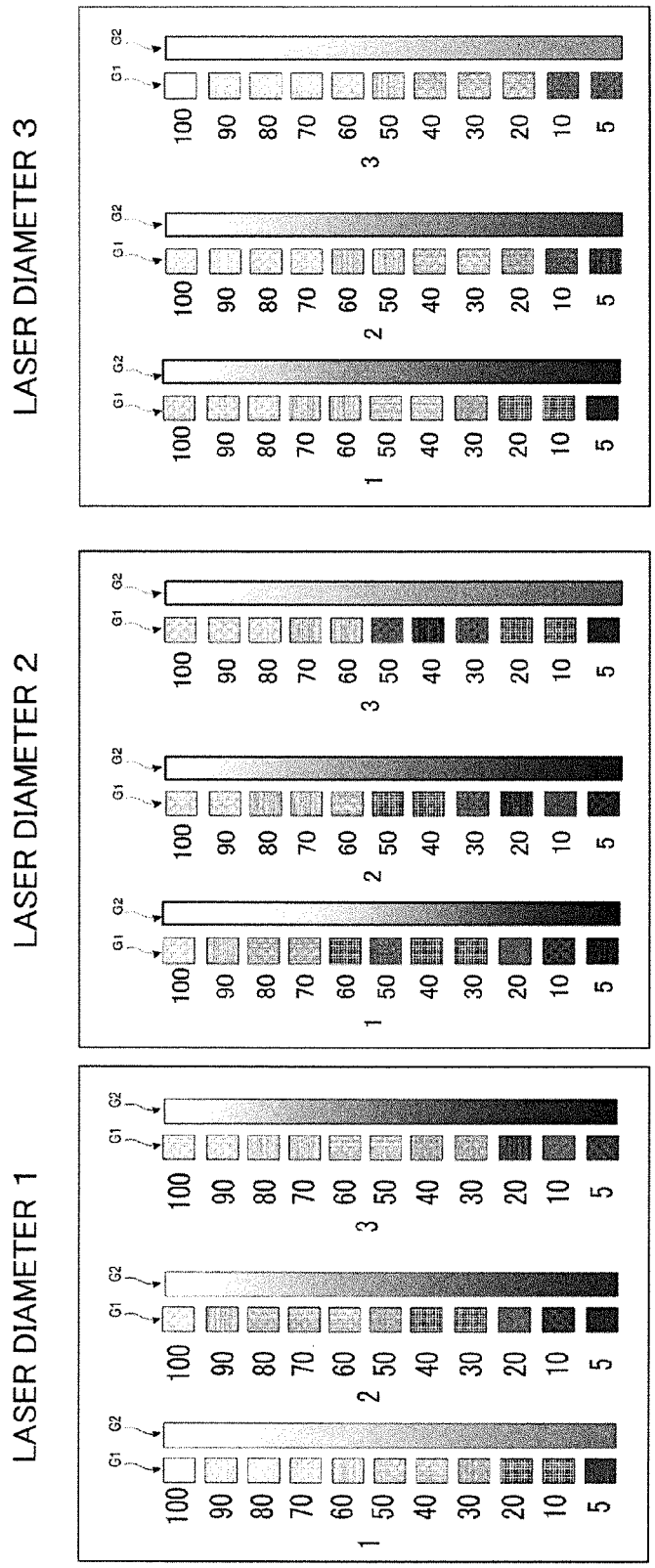
FIG. 9 is a diagram showing another example of the gradation images.

In yet another example, the gradation images may be prepared in accordance with the diameters of lasers used for laser irradiation as shown in the example in FIG. 9, and then these gradation images may be stored in the HDD 214. FIG. 9 shows gradation images for three laser diameters 1, 2 and 3. In this case, the operator operates the input unit 217 to select one or more gradation images corresponding to desired laser diameters, and the selected gradation image/s is/are used in the laser irradiation instruction receiving process described above.

Figure 10:
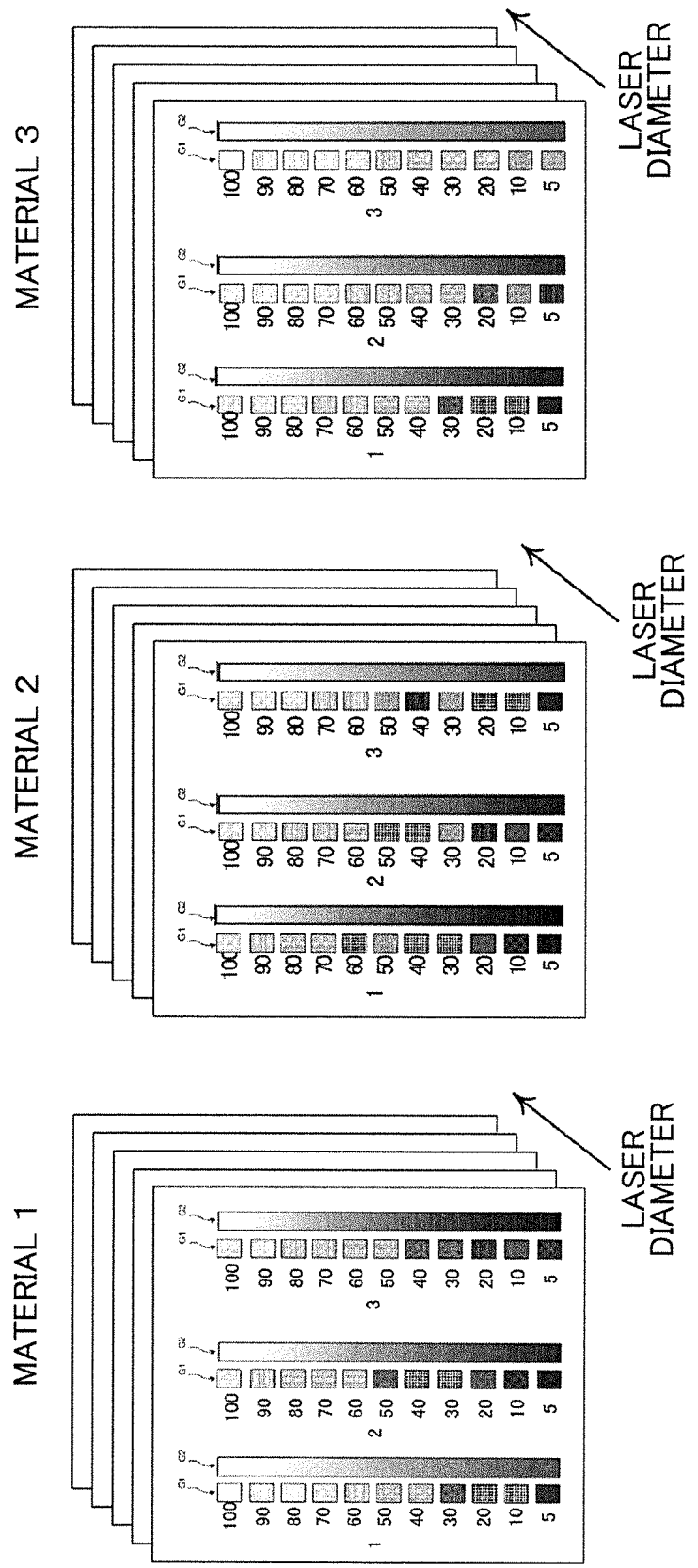
FIG. 10 is a diagram showing yet another example of the gradation images.

In yet another example, each of the groups of gradation images prepared for the laser diameters may be prepared with respect to printing inks or the material of the laser irradiation target as shown in the example in FIG. 10, and then these prepared gradation images may be stored in the HDD 214. In this case, the operator operates the input unit 217 to select one or more gradation image groups for desired materials and laser diameters, and then the selected gradation image group/s is/are used in the laser irradiation instruction receiving process described above.

When the laser irradiation instruction receiving process is performed using the gradation images corresponding to each laser diameter in the process of creating a laser irradiation execution instruction in step S13, the instruction output unit 204 creates a laser irradiation execution instruction for executing laser irradiation using the laser diameter associated with the used gradation images in addition to the laser intensities and laser irradiation densities designated for the respective places.

When the operator selects a plurality of gradation images or gradation image groups from the gradation images shown in FIGS. 8 to 10, the display controller 202 causes the display unit 215 to display all the selected gradation images or gradation image groups. Then, based on the operation performed on the input unit 217 by the operator, the instruction receiver 203 receives a designation of display areas of image portions showing coloring states in any of the gradation images or gradation image groups. Consequently, the instruction output unit 204 outputs a laser irradiation execution instruction to the laser irradiation apparatus 1, thereby allowing the laser irradiation apparatus 1 to execute laser irradiation while changing the laser diameter when forming an image by means of laser marking based on a single printing target data item.

The result of laser marking image formation shows that image reproducibility largely depends not only on the laser irradiation intensities and irradiation densities but also on the printing inks, the material of the irradiation target, and the laser diameters. Therefore, preparing such gradation images enables easy prediction of a printing result such as chromogenic properties caused by laser irradiation, without actually executing the laser irradiation.

Second Embodiment

A second embodiment illustrates an example in which laser intensities and laser irradiation speeds are selected as a plurality of conditions (the plurality of parameters) for laser irradiation. A block configuration of the information processing apparatus 2 according to the second embodiment is the same as the one according to the first embodiment described above based on FIG. 2, and has the control unit 200, ROM 212, RAM 213, HDD 214, display unit 215, communication interface 216, and input unit 217.

In this configuration, the content of the laser irradiation driving program stored in the HDD 214 is different from that described in the first embodiment. The laser irradiation driving program of the second embodiment is a program for defining intensities and speeds of laser irradiation performed by the laser irradiation unit 12 of the laser irradiation apparatus 1, and driving the laser irradiation unit 12 at the defined laser intensities and irradiation speeds. The HDD 214 stores therein, with respect to the combinations of laser intensities and laser irradiation speeds, an image (a matrix image, described hereinafter), composed of a group of specific images showing coloring states of a laser irradiation target to be irradiated with a laser at the defined laser intensities and laser irradiation speeds.

The configuration of the control unit 200 is the same as the one described in the first embodiment, and the functional block diagram of the control unit 200 shown in FIG. 2 is applied as it is in the second embodiment. The control unit 200 is operated according to the laser irradiation driving program and thereby functions as the controller 201, display controller 202, instruction receiver 203, instruction output unit 204, and data acquisition unit 205. The configurations of these functional parts have already been described above; thus, the descriptions thereof are omitted herein.

Figure 11:
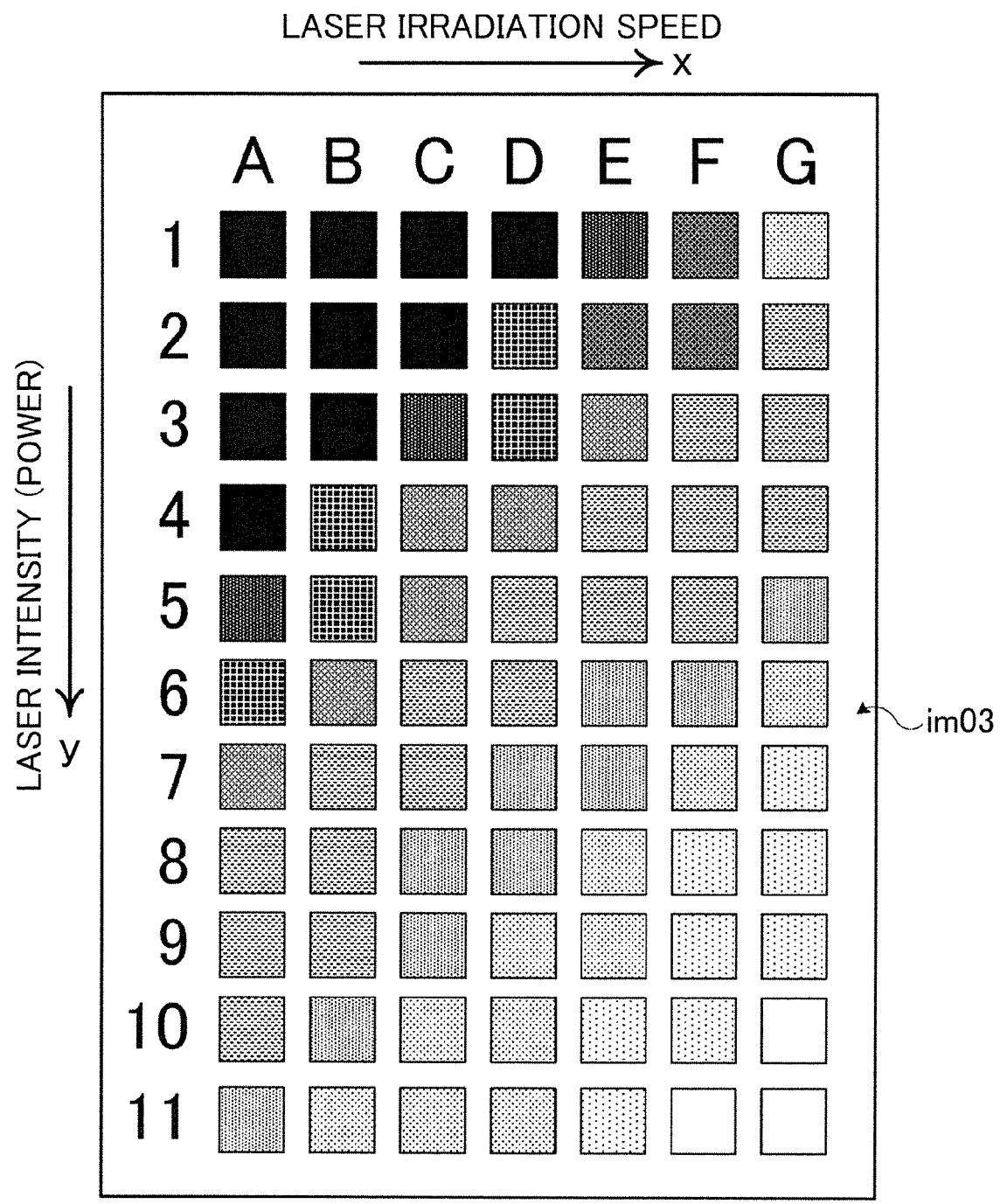
FIG. 11 is a diagram showing an example of images showing coloring states corresponding to combinations of laser intensities and laser irradiation speeds in an information processing apparatus according to a second embodiment.

FIG. 11 is a diagram showing an example of images that show coloring states for respective combinations of laser intensities and laser irradiation speeds in the information processing apparatus 2 according to the second embodiment. As shown in FIG. 11, an image with a matrix arrangement of images showing coloring states is stored in the HDD 214 for respective combinations of laser intensities (laser powers: 1 to 11 in FIG. 11) and laser irradiation speeds (A to G in FIG. 11) (referred to as "matrix image im03," hereinafter). For example, the operator operates the input unit 217 to input the matrix image im03 to the information processing apparatus 2 from the computer or scanner through the communication interface 216. The controller 201 acquires this matrix image im03 and stores it in the HDD 214. The display controller 202 displays the matrix image im03 stored in the HDD 214 on the display unit 215.

While the display unit 215 displays the matrix image im03, the operator operates the mouse pointer functioning as the input unit 217, to designate an image portion showing a desired coloring state. The instruction receiver 203 takes this designation by the operator as a designation of a laser intensity and laser irradiation speed associated with an image showing the coloring state displayed in the designated portion. The instruction output unit 204 outputs, to the laser irradiation apparatus 1, a laser irradiation execution instruction for executing laser irradiation at the laser intensity and laser irradiation speed, the designation of which is received by the instruction receiver 203.

Figure 12:
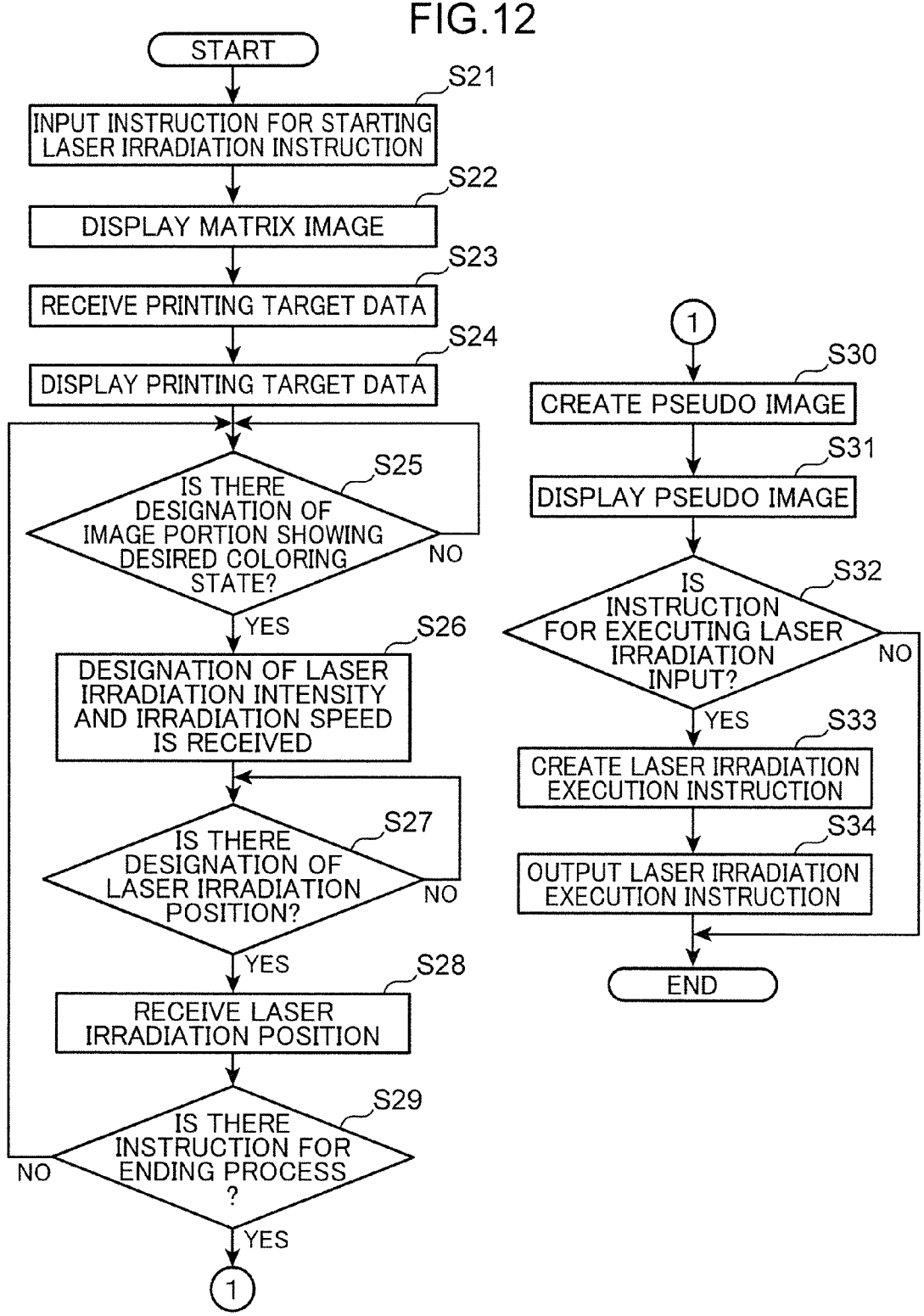
FIG. 12 is a flowchart showing a laser irradiation instruction receiving process executed by the information processing apparatus according to the second embodiment.

A laser irradiation instruction receiving process executed by the information processing apparatus 2 is described next. FIG. 12 is a flowchart showing a laser irradiation instruction receiving process executed by the information processing apparatus 2 according to the second embodiment. Let it assume that the images that show coloring states corresponding to the combinations of laser intensities and laser irradiation speeds are stored beforehand in the HDD 214 by the operator.

When the operator operates the input unit 217 to input an instruction for starting a laser irradiation instruction (S21), the display controller 202 reads the images showing the coloring states from the HDD 214 and displays these images on the display unit 215 (S22).

Figure 13:
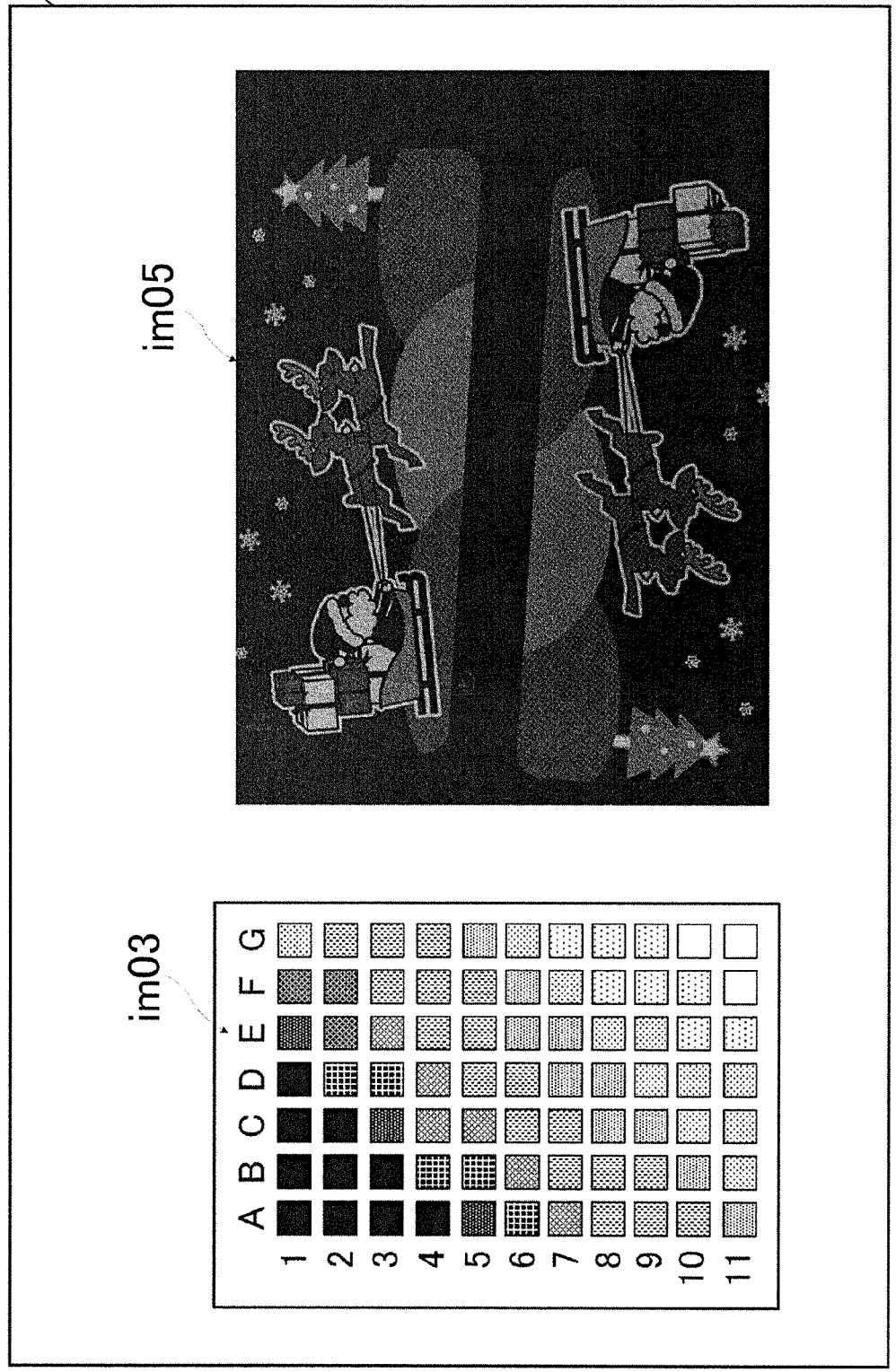
FIG. 13 is a diagram showing how the image showing the coloring states and an image showing printing target data are displayed on a display unit according to the second embodiment.

Subsequently, when the data acquisition unit 205 receives the printing target data based on a further operation on the input unit 217 executed by the operator (S23), the display controller 202 displays an image im05, shown by the printing target data, on the display unit 215, as shown in the example in FIG. 13 (S24). It should be noted that steps S23 and S24 may be executed prior to step S22.

For example, this embodiment employs an image in which each of specific images is drawn at a predetermined position, the specific images showing coloring states that are obtained through a series of laser irradiations with the combinations of laser intensities and laser irradiation speeds. For instance, the matrix image im03 shown in FIG. 11 is employed. In this matrix image im03, images showing coloring states that are obtained through laser irradiation with the combinations of laser intensities and laser irradiation speeds are arranged into a matrix with the laser irradiation intensities in the y-direction and the laser irradiation speeds in the x-direction.

The instruction output unit 204 stores the laser intensities and laser irradiation speeds associated with these images contained in the matrix image im03, with respect to these images. For instance, the each position of the each specific images in this matrix image im03 is already defined. Thus, a laser intensity and a laser irradiation speed corresponding to each of the areas representing the positions of the images in the matrix image im03 are stored in the instruction output unit 204 beforehand.

Let it assume that while the matrix image is displayed on the display unit 215, the operator operates the input unit 217 to designate a part of the areas of the matrix image and thereby input the corresponding laser intensity and laser irradiation speed. In this case, the instruction output unit 204 may store the input laser intensity and laser irradiation speed in correspondence with the image displayed in the designated part of the areas (any of the images of the matrix image). This allows the operator to set laser intensities and laser irradiation speeds in accordance with the performance of the laser irradiation apparatus.

Let it assume that, as described above, while the display controller 202 displays the printing target data on the display unit 215 (S24), the operator operates, as shown in FIG. 14, the mouse pointer functioning as the input unit 217, to design a display area corresponding to an image portion im04 showing a desired coloring state, from among the display areas of the image im03 showing the coloring states displayed on the display unit 215 (YES in S25). In this case, the instruction receiver 203 receives a designation of a laser intensity and laser irradiation speed associated with the image corresponding to the coloring state displayed by the image portion im04 (S26).

As shown in FIG. 15, the operator further operates the mouse pointer to designate, on the image im05 represented by the printing target data displayed on the display unit 215, a position p2 on which laser irradiation is executed at the laser intensity and laser irradiation speed received in step S26 (YES in S27). The instruction receiver 203 takes the designation of the position p2 as a place to execute laser irradiation at the laser intensity and laser irradiation speed received in step S26 (S28).

Subsequently, steps S25 to S28 are continuously executed until the operator operates the input unit 217 to input an instruction for ending the process of designating a laser irradiation position where laser irradiation is executed at the laser irradiation intensity and laser irradiation speed (NO in S29).

When the operator inputs an instruction for ending the process of designating a laser irradiation position where laser irradiation is executed at the laser irradiation intensity and laser irradiation speed (YES in S29), the display controller 202 determines the coloring states associated with the laser intensities and laser irradiation speed for the respective places (on the image shown by the printing target data) that have been received in step S28. Using the images showing the coloring states, the display controller 202 also creates pseudo images showing coloring states that are expected to be obtained after laser irradiation is executed on the irradiation target (S30). The display controller 202 displays the created pseudo images on the display unit 215 (S31). For example, in step S30, the display controller 202 creates the pseudo images by using the data of the images showing the coloring states, part of the matrix image stored in the HDD 214. With these pseudo images displayed, the operator can accurately predict a resultant image created with the coloring states that are set for the respective places of the printing target data, as described above.

Let it assume that, after the pseudo images are displayed, the operator operates the input unit 217 to input an instruction for executing laser irradiation on the respective places that have been received, at the laser intensities and laser irradiation speeds (YES in S32). In this case, the instruction output unit 204 creates a laser irradiation execution instruction for executing laser irradiation on the respective places, at the designated laser intensities and laser irradiation speeds (S33). The instruction output unit 204 outputs the created laser irradiation execution instruction to the laser irradiation apparatus 1 through the communication interface 216 (S34). The process is ended in a case where the operator does not input the foregoing laser irradiation execution instruction within a predetermined period of time after the pseudo images are displayed (NO in S32).

Upon reception of the instruction, the laser irradiation apparatus 1 causes the controller 101 (FIG. 27) to control the drive of the laser irradiation unit in accordance with the instruction, and execute laser irradiation on the laser irradiation target.

According to this embodiment, at the time of laser marking image formation, the results of the image formation can be made predictable prior to the execution of laser irradiation on the laser irradiation target, thereby obtaining an image formation result close to a desired result of the user. In addition, the instruction receiver 203 receives the designations of coloring states from the operator based on the matrix image as described above, enabling the operator to easily check a plurality of coloring states and easily select a desired coloring state.

In the foregoing embodiment, the instruction receiver 203 receives a designation instruction that indicates that a position designated by the operator from the image shown by the image data acquired by the data acquisition unit 205 is a laser irradiation position. Such configuration allows the operator to easily set how to develop the color of the position in the image represented by the printing target data.

Figure 16:
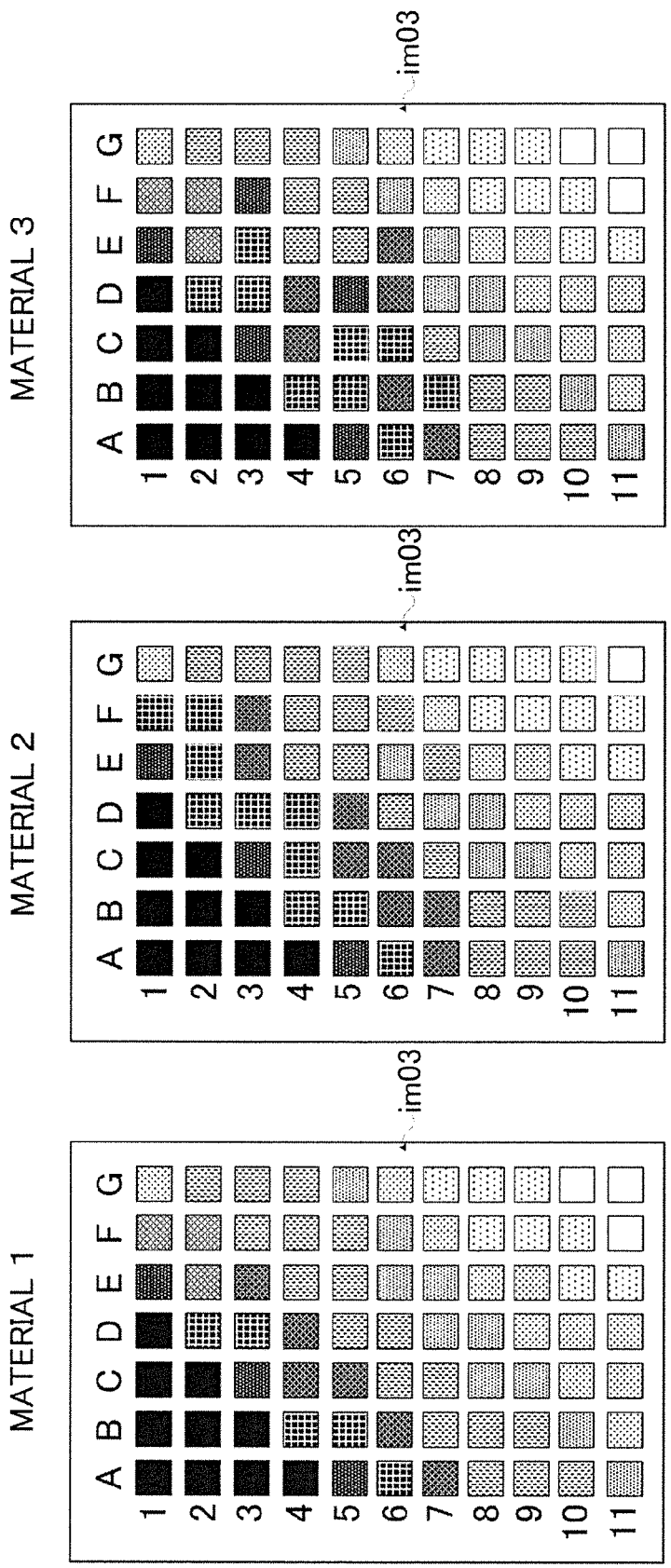
FIG. 16 is a diagram showing another example of the images showing the coloring states in the form of matrix images.

Another example of the matrix image stored in the HDD 214 is described next. FIG. 16 is a diagram showing another example of the matrix image im03. The above has described an example of using the matrix image composed of images showing coloring states corresponding to the laser intensities and laser irradiation speeds; however, the present disclosure is not limited to this configuration. For instance, the matrix images may be prepared in accordance with printing inks to be radiated or the material of the target, and then these prepared matrix images may be stored in the HDD 214. FIG. 16 shows matrix images im03 for three materials 1, 2 and 3. In this case, the operator operates the input unit 217 to select a matrix image corresponding to a desired material, and the selected matrix image is used in the laser irradiation instruction receiving process described above.

Figure 17:
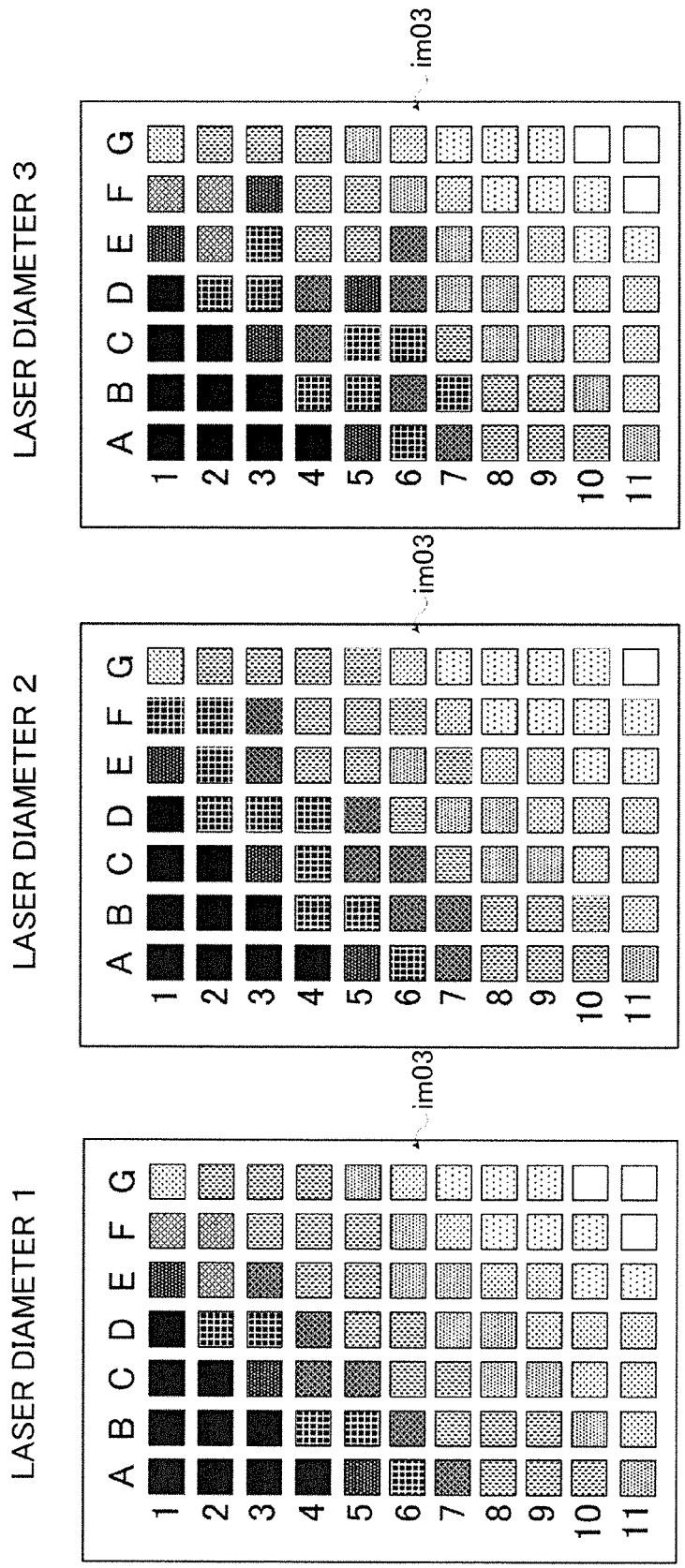
FIG. 17 is a diagram showing another example of the matrix images.

In yet another example, the matrix images may be prepared in accordance with the diameters of lasers used for laser irradiation as shown in the example in FIG. 17, and then these matrix images may be stored in the HDD 214. FIG. 17 shows matrix images im03 for three laser diameters 1, 2 and 3. In this case, the operator operates the input unit 217 to select a matrix image corresponding to a desired laser diameter, and the selected matrix image is used in the laser irradiation instruction receiving process described above.

Figure 18:
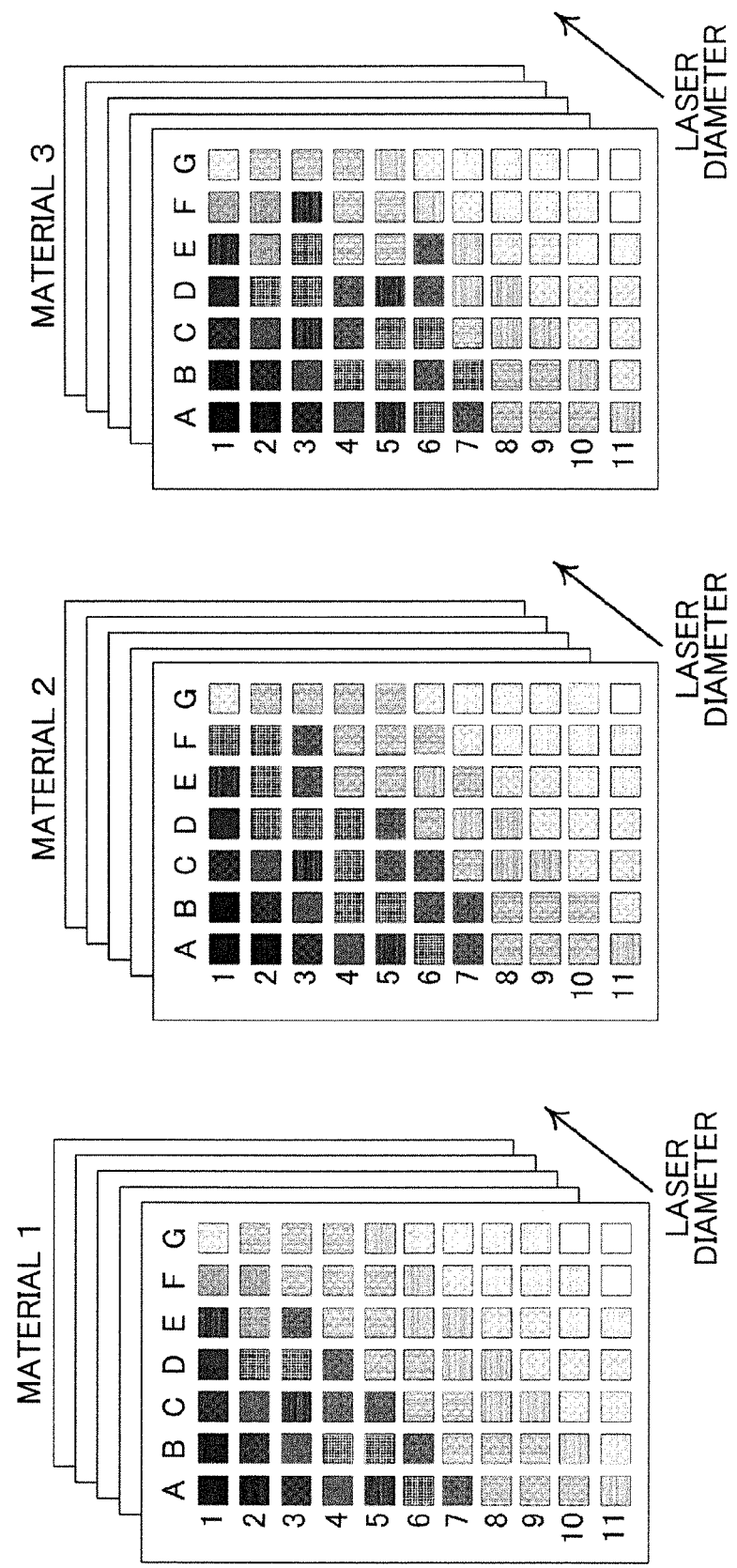
FIG. 18 is a diagram showing yet another example of the matrix images.

In yet another example, each of the groups of matrix images prepared for the laser diameters may be prepared with respect to printing inks or the material of the laser irradiation target as shown in the example in FIG. 18, and then these prepared matrix images may be stored in the HDD 214. In this case, the operator operates the input unit 217 to select a matrix image group for a desired material and laser diameter, and then the selected matrix image group is used in the laser irradiation instruction receiving process described above.

When the foregoing laser irradiation instruction receiving process is performed using the matrix image corresponding to each laser diameter in the process of creating a laser irradiation execution instruction in step S33, the instruction output unit 204 creates a laser irradiation execution instruction for executing laser irradiation using the laser diameter associated with the used matrix image in addition to the laser intensities and laser irradiation speeds designated for the respective places.

The result of laser marking image formation shows that image reproducibility largely depends not only on the laser irradiation intensities and irradiation speeds but also on the printing inks, the material of the irradiation target, and the laser diameters. Therefore, preparing such matrix images enables easy prediction of a printing result such as chromogenic properties caused by laser irradiation, without actually executing the laser irradiation.

Third Embodiment

A third embodiment illustrates an example in which combinations of conditions for the laser irradiation capability and the numbers of laser irradiations as a plurality of conditions (the plurality of parameters) for laser irradiation. As the conditions for the laser irradiation capability, a combination of a laser intensity and a laser irradiation speed used for laser irradiation or a combination of a laser intensity and a laser irradiation density can be illustrated.

Figure 19:
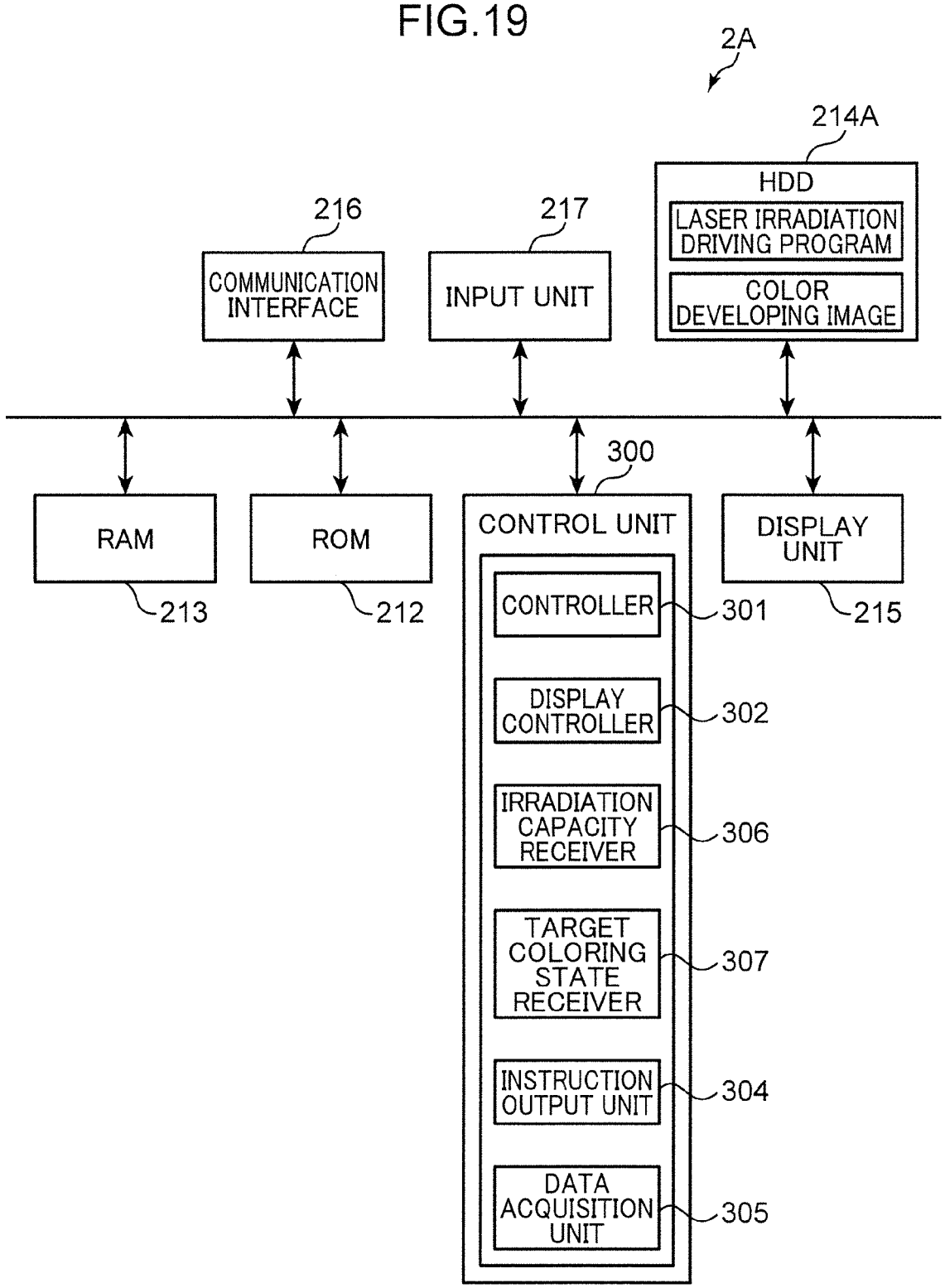
FIG. 19 is a block diagram schematically showing an internal configuration of an information processing apparatus according to a third embodiment.

FIG. 19 is a block diagram schematically showing an internal configuration of an information processing apparatus 2A according to the third embodiment. The information processing apparatus 2A has a control unit 300, the ROM 212, the RAM 213, an HDD 214A, the display unit 215, the communication interface 216, and the input unit 217. These parts are capable of transmitting and receiving data or signals to and from one another through a CPU bus. The configuration of the information processing apparatus 2A is the same as the one of the first embodiment illustrated in FIG. 2, except for the functional configuration of the control unit 300 and the contents stored in the HDD 214A.

The control unit 300 is configured with a CPU and the like. The ROM 212 stores an operation program for a basic operation of the information processing apparatus 2A. The RAM 213 is used as an operation area or the like of the control unit 300.

The HDD (the storage unit/irradiation parameter storage unit) 214A is a storage medium for storing various data and programs. The laser irradiation driving program described above is stored in the HDD 214A. In the HDD 214A is stored, for each of the combinations of laser intensities and laser irradiation speeds, an image (a color developing image, described hereinafter) consisting of a group of images showing coloring states of a laser irradiation target that are obtained when laser irradiation is performed at the laser intensities and laser irradiation speeds.

The control unit 300 functions as a controller 301, an instruction output unit 304, an irradiation capability receiver 306, a target coloring state receiver 307, a display controller 302, and a data acquisition unit 305 by being operated in accordance with the laser irradiation driving program. However, the controller 301, instruction output unit 304, irradiation capability receiver 306, target coloring state receiver 307, display controller 302, and data acquisition unit 305 of the control unit 300 may each be configured with a hard circuit whether being operated by the control unit 300 based on the laser irradiation driving program or not.

The display unit 215 is configured with a LCD or the like. The communication interface 216 functions as an interface for communicating data with the laser irradiation apparatus 1, a computer, a scanner, or the like. The input unit 217, configured with a keyboard, a mouse pointer or the like, receives various operation instructions from the operator.

The controller 301 of the control unit 300 is in charge of controlling the overall operation of the information processing apparatus 2A. The display controller 302 is in charge of controlling display provided by the display unit 215. The display controller 302 displays images showing coloring states of the laser irradiation target stored in the HDD 214A, with respect to the combinations of laser intensities and laser irradiation speeds, on the basis of the number of laser irradiations.

The irradiation capability receiver 306 receives, from the operator, designations of laser irradiation capabilities, with which the laser irradiation apparatus 1 executes laser irradiation. The designations are each input through an operation on the input unit 217 performed by the operator. For instance, the irradiation capability receiver 306 receives designations of laser irradiation intensities and laser irradiation speeds as the laser irradiation capabilities.

The target coloring state receiver 307 receives a designation of a target coloring state to be resulted from laser irradiation executed on an irradiation target by the laser irradiation apparatus 1. In other words, when one or more laser irradiations are executed with the designated laser irradiation capabilities received by the irradiation capability receiver 306, the target coloring state receiver 307 stores the coloring state obtained at each laser irradiation (e.g., shades that vary through the laser irradiations, a hue obtained at each laser irradiation, etc.). The target coloring state receiver 307 stores a message that urges to select a coloring state shown by a shade or hue in association with a corresponding image (or message) showing the shades that vary through the laser irradiations or a hue obtained at each laser irradiation. The display controller 302 displays these on the display unit 215.

The target coloring state receiver 307 stores, for each of the images, a laser intensity, a laser irradiation speed, and the number of laser irradiations that are associated with each image. When the operator operates the input unit 217 to input an instruction for designating a shade or hue, the target coloring state receiver 307 receives this instruction. The target coloring state receiver 307 is also capable of receiving an instruction for designating the shade or hue for each of the positions in the irradiation target.

Based on the laser irradiation capabilities, the designations of which are received by the irradiation capability receiver 306, the instruction output unit 304 outputs, to the laser irradiation apparatus 1, a laser irradiation execution instruction for causing the laser irradiation apparatus to execute laser irradiation on the irradiation target by the number of times associated with the coloring states, the designations of which are received by the target coloring state receiver 307. In other words, the instruction output unit 304 stores each laser irradiation capability and the number of laser irradiations that are associated with the shade or hue, and causes the laser irradiation apparatus 1 to execute laser irradiation based on the laser irradiation capabilities and number of laser irradiations associated with the shades or hues that are indicated by the designations received by the target coloring state receiver 307.

Figure 20:
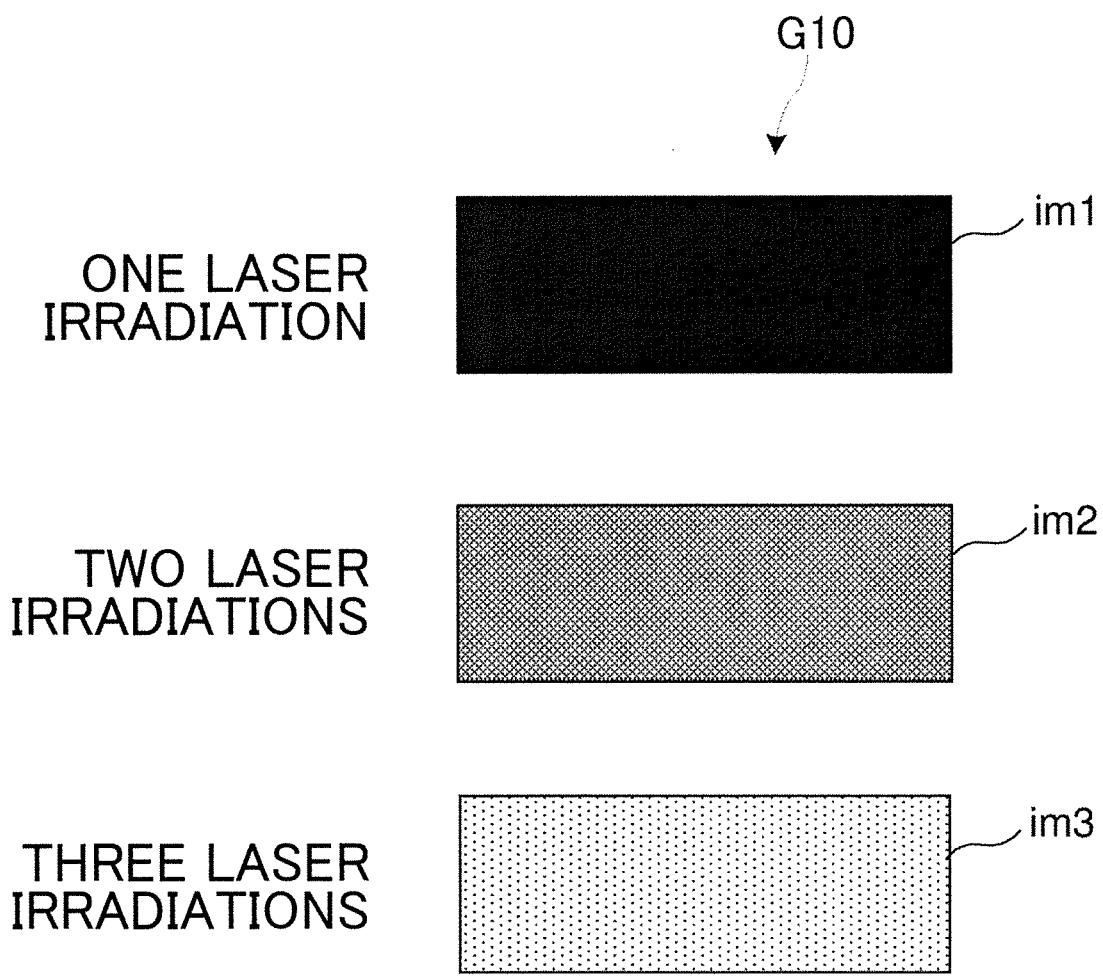
FIG. 20 is a diagram showing an example of images showing coloring states corresponding to combinations of laser intensities and laser irradiation speeds in the information processing according to the third embodiment.

FIG. 20 is a diagram showing an example of images showing coloring states corresponding to the combinations of laser intensities and laser irradiation speeds in the information processing apparatus 2A according to the third embodiment. Images showing coloring states associated with the combinations of laser irradiation intensities and laser irradiation speeds are stored in the HDD 214A or target coloring state receiver 307 on the basis of the numbers of laser irradiations, as shown in FIG. 20. FIG. 20 shows a color developing image G10 having these images arranged in a row. Once the irradiation capability receiver 306 receives designations of laser irradiation intensities and laser irradiation speeds, the display controller 302 causes the display unit 215 to display images im1, im2, and im3 showing respectively coloring states associated with the received combinations of laser irradiation intensities and laser irradiation speeds.

While the display unit 215 displays the images showing coloring states, the operator operates the mouse pointer functioning as the input unit 217, to designate an image portion showing a desired coloring state. The target coloring state receiver 307 takes this designation by the operator as a designation of a laser intensity, laser irradiation speed, and number of laser irradiations that are associated with an image showing the coloring state displayed in the designated portion.

The instruction output unit 304 outputs, to the laser irradiation apparatus 1, a laser irradiation execution instruction to cause the laser irradiation apparatus 1 to execute laser irradiation at the designated laser intensity and laser irradiation speed by the corresponding to the image that is number of times received by the target coloring state receiver 307.

The operator, for example, operates the input unit 217 to input the color developing image for each execution number of irradiations with respect to each of the combinations of laser irradiation intensities and laser irradiation speeds into the information processing apparatus 2A from the computer or scanner through the communication interface 216. The controller 301 acquires the color developing image and stores it in the HDD 214A. The display controller 302 displays the color developing image stored in the HDD 214A on the display unit 215. The controller 301 also outputs, to the laser irradiation apparatus 1, a laser irradiation execution instruction corresponding to the designated laser intensity, laser irradiation speed, and number of laser irradiations, the designation of which is received by the target coloring state receiver 307 due to operation by the operator.

The data acquisition unit 305 acquires image data as printing target data from the laser irradiation apparatus 1, computer, scanner or the like through the communication interface 216. The printing target data acquired by the data acquisition unit 305 are in the form of images composed of, for example, drawing data created with a drawing application such as Illustrator™, drawing data created with a CAD application, character data created with an application capable of inputting characters, such as a word processor, image data such as JPEG or BMP, and the like. The printing target data are composed of, for example, vector data, raster data, a combination thereof, or the like. However, these are merely examples of the printing target data and are not intended to limit the printing target data thereto. Note that the target coloring state receiver 307 is capable of receiving a designation instruction for designating a position on an image represented by the printing target image data acquired by the data acquisition unit 305 as a laser irradiation position on which laser irradiation is executed by the laser irradiation apparatus 1.

Figure 21:
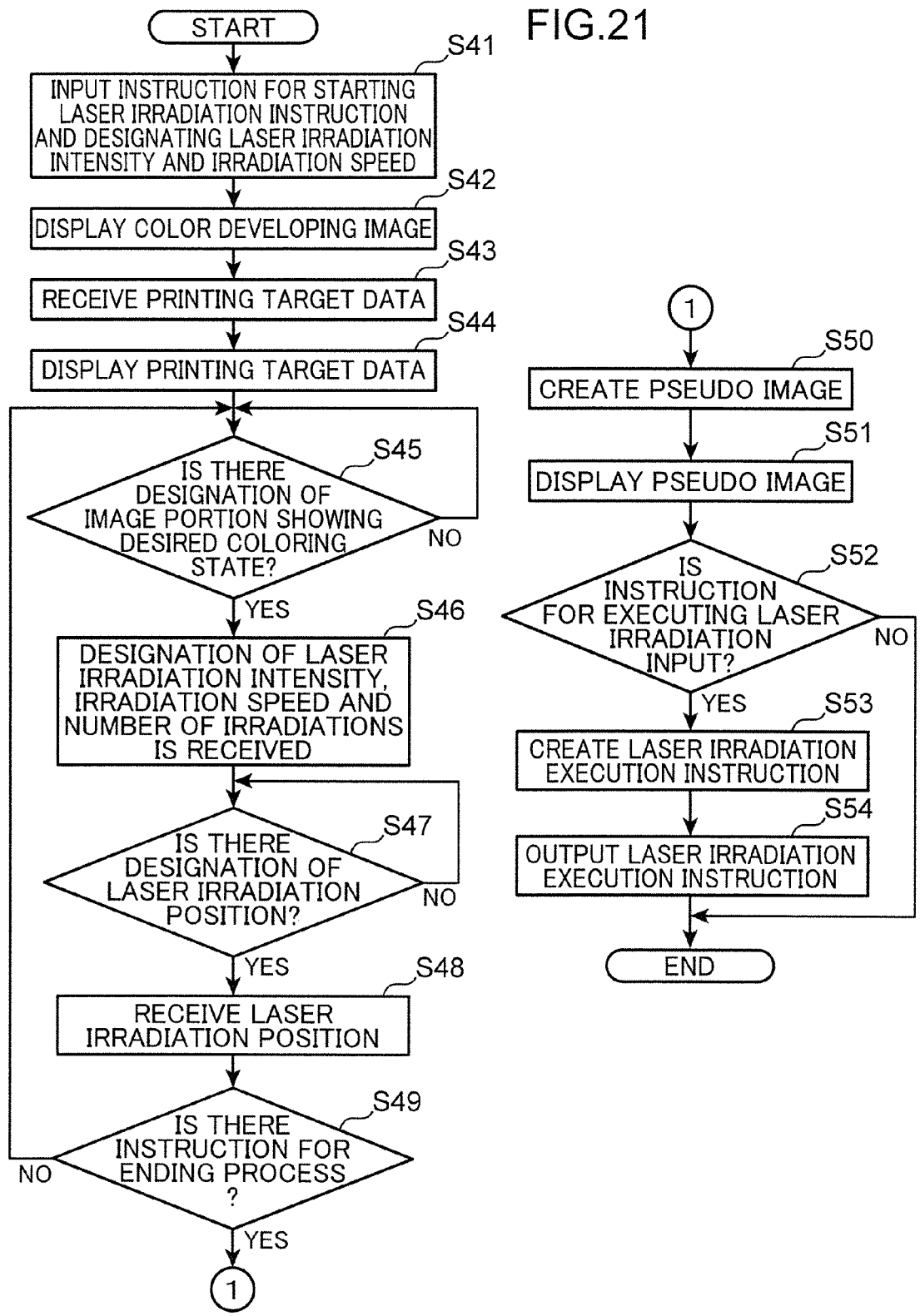
FIG. 21 is a flowchart showing a laser irradiation instruction receiving process executed by the information processing apparatus according to the third embodiment.

Next is described a laser irradiation instruction receiving process executed by the information processing apparatus 2A. FIG. 21 is a flowchart showing a laser irradiation instruction receiving process executed by the information processing apparatus 2A according to the third embodiment. Let it assume that the color developing image for each execution number of laser irradiations is stored in the HDD 214A beforehand by the operator with respect to the combinations of laser intensities and laser irradiation speeds.

When the operator operates the input unit 217 to input an instruction for starting a laser irradiation instruction and an instruction for designating a laser intensity and laser irradiation speed and the irradiation capability receiver 306 receives these instructions (S41), the display controller 302 reads the images showing the coloring states from the HDD 214A and displays them on the display unit 215 (S42).

Figure 22:
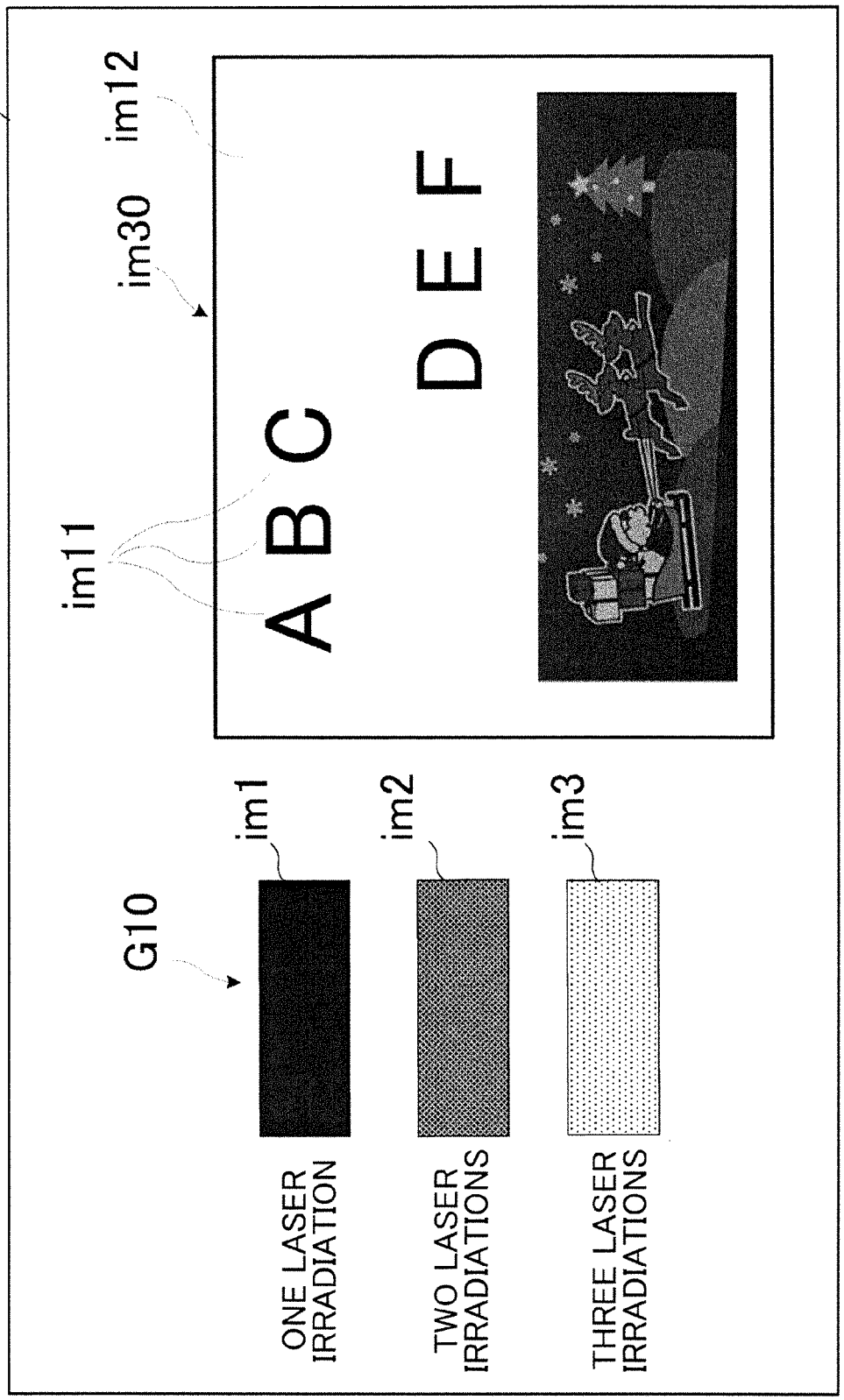
FIG. 22 is a diagram showing how the images showing the coloring states and an image showing printing target data are displayed on a display unit according to the third embodiment.
Figure 23:
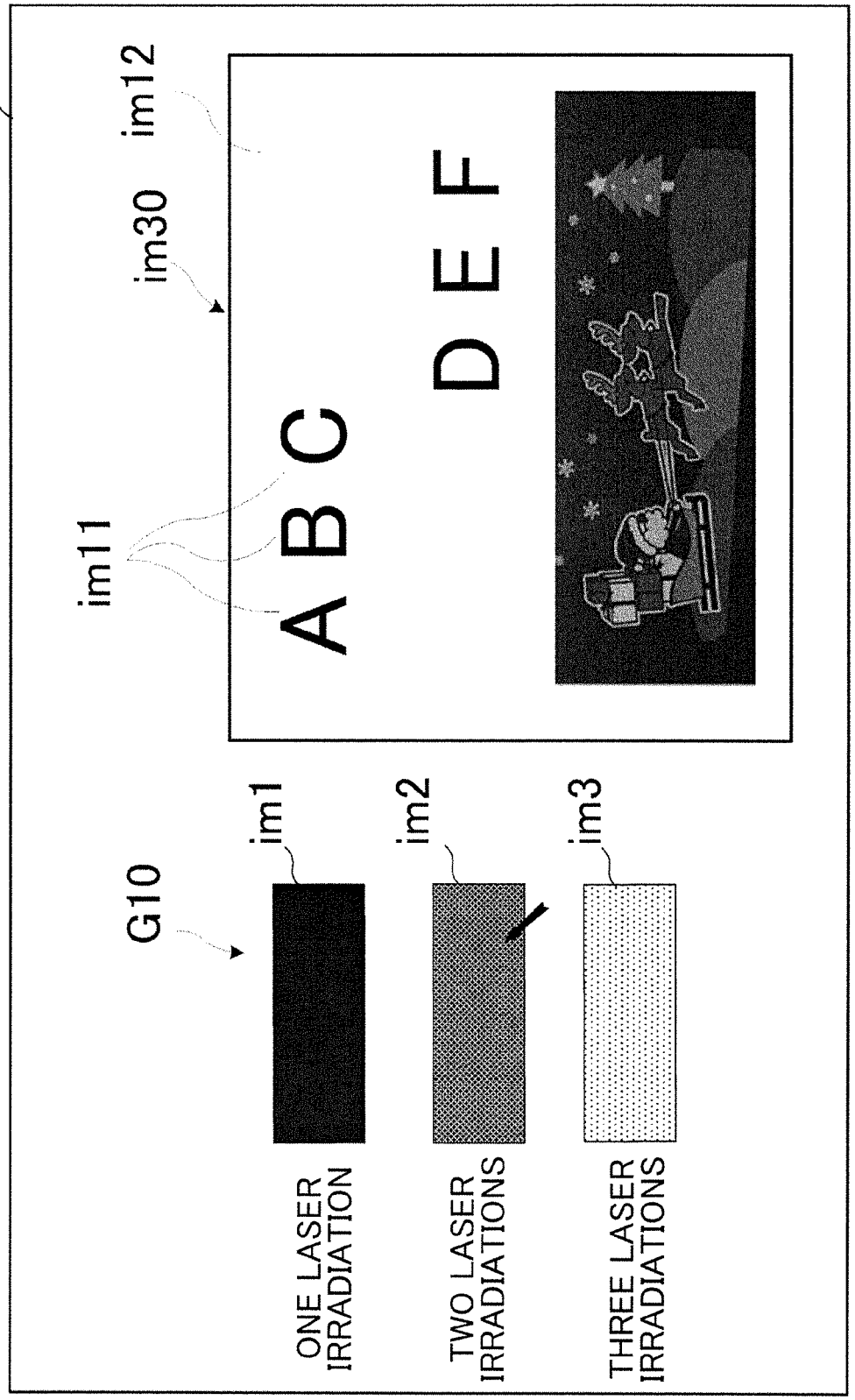
FIG. 23 is a diagram showing how an operator designates a desired image on the display shown in FIG. 22.

Subsequently, when the data acquisition unit 305 receives the printing target data based on a further operation on the input unit 217 executed by the operator (S43), the display controller 302 displays an image, shown by the printing target data, on the display unit 215 (S44). At this moment, an image im30 showing the color developing image G10 and printing target data is displayed on the display unit 215, as shown in the example in FIG. 22. It should be noted that steps S43 and S44 may be executed prior to step S42.

Let it assume that, as described above, while the display controller 302 displays the image im30 represented by the printing target data on the display unit 215 (S44), the operator operates the mouse pointer functioning as the input unit 217, to designate a display area corresponding to an image portion im2 showing a desired coloring state, from among the display areas of the color developing image G10 showing the coloring states displayed on the display unit 215 (YES in S45). In this case, the target coloring state receiver 307 receives a designation for a laser intensity, a laser irradiation speed, and the number of laser irradiations associated with an image corresponding to the coloring state displayed by the image portion im2 (S46). Note that the target coloring state receiver 307 stores the laser intensities, the laser irradiation speeds, and the number of laser irradiations associated with the each image included in the color developing images.

Figure 24:
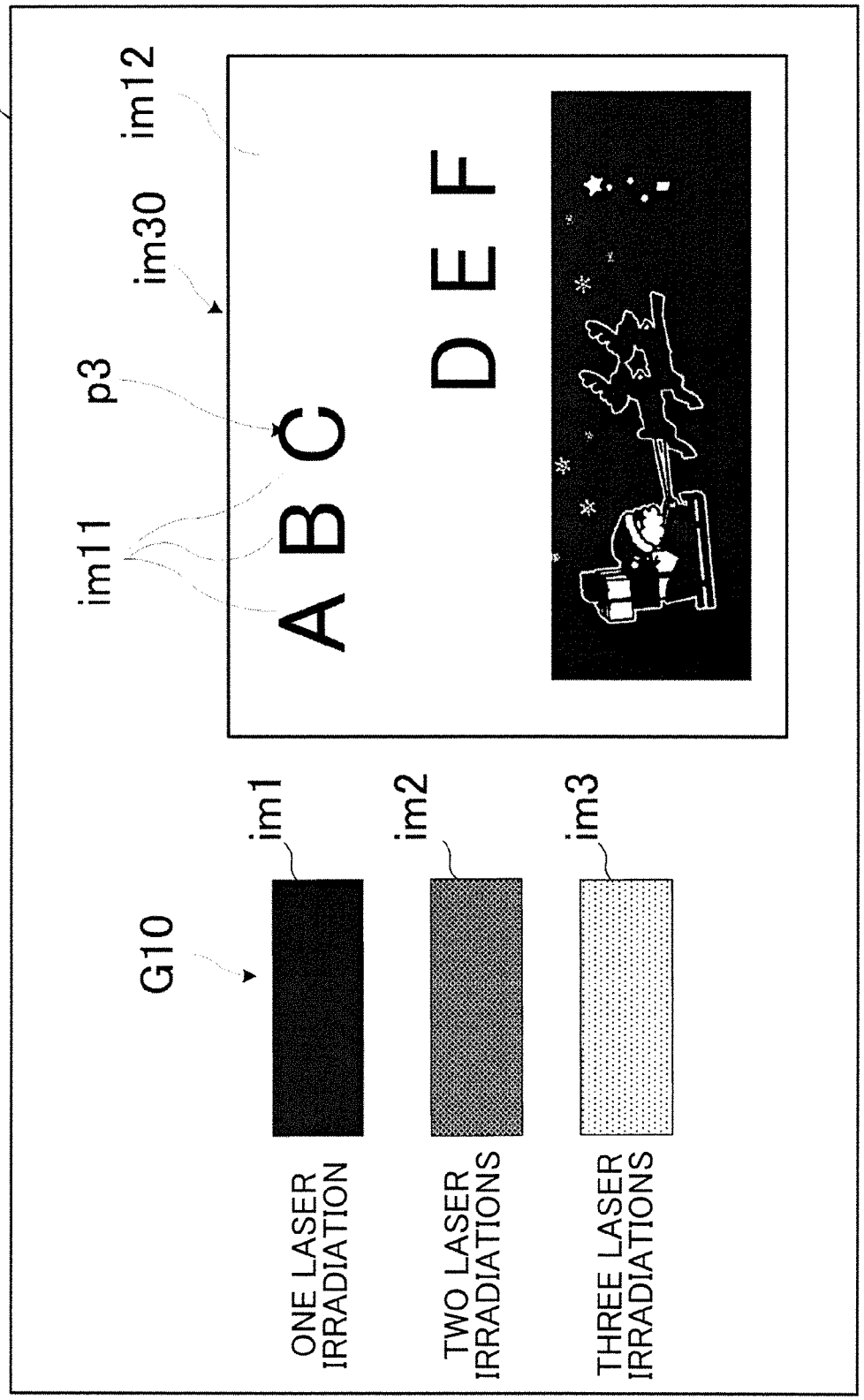
FIG. 24 is a diagram showing how the operator designates a desired portion on the display shown in FIG. 22.

As shown in the example in FIG. 24, the operator further operates the mouse pointer to designate, on the image im30 shown by the printing target data displayed on the display unit 215, a position p3 where laser irradiation is executed at the laser intensity, a laser irradiation speed, and the laser irradiations received in step S46 (YES in S47). The target coloring state receiver 307 takes the designation of the position p3 as a place where laser irradiation is executed at the laser intensity, a laser irradiation speed, and the number of laser irradiations, which are received in step S46 (S48).

Here, the operator can operate the input unit 217 to designate the entire image im30 shown by the printing target data as the place to execute laser irradiation at the laser intensity, laser irradiation densities, and number of laser irradiations received by the target coloring state receiver 307 in step S46.

Subsequently, steps S45 to S48 are continuously executed until the operator operates the input unit 217 to input an instruction for ending the process of designating a laser irradiation position where laser irradiation is executed at the laser irradiation intensities, laser irradiation speeds, and number of laser irradiations (NO in S49).

When the operator inputs an instruction for ending the process of designating a laser irradiation position where laser irradiation is executed at the laser irradiation intensity, laser irradiation speed, and number of laser irradiations (YES in S49), the display controller 302 determines the coloring states associated with the laser intensities, laser irradiation speeds, and the number of laser irradiations for the respective places that have already been received in step S48 (the respective places on the image displayed by the image im30 shown by the printing target data). Using the images showing the coloring states, the display controller 302 also creates pseudo images showing coloring states that are expected to be obtained after laser irradiation is executed on the irradiation target (S50). The display controller 302 displays the created pseudo images on the display unit 215 (S51). For example, in step S50, the display controller 302 creates the pseudo images by using the data of the images showing the coloring states, part of the color developing image stored in the HDD 214A. With this pseudo images displayed, the operator can accurately predict a resultant image created with the coloring states that are set for the respective places of the printing target data, as described above.

Let it assume that, after the pseudo images are displayed, the operator operates the input unit 217 to input an instruction for executing laser irradiations on the respective places on the basis of the accepted laser intensities, laser irradiation speeds, and the number of raiser irradiations. (YES in S52). In this case, the instruction output unit 304 creates a laser irradiation execution instruction for executing laser irradiations on the respective places on the basis of the accepted laser intensities, laser irradiation speeds, and the number of raiser irradiations (S53). The instruction output unit 304 outputs the created laser irradiation execution instruction to the laser irradiation apparatus 1 through the communication interface 216 (S54).

Upon reception of the instruction, the laser irradiation apparatus 1 causes the controller 101 (FIG. 27) to control the drive of the laser irradiation unit in accordance with the instruction, to execute laser irradiation on the laser irradiation target.

According to this embodiment, at the time of laser marking image formation, the number of laser irradiations is set at different values depending on the coloring states desired by the operator, and the coloring states obtained by laser marking are changed by performing laser irradiation on each position a number of times, depending on the coloring states. Therefore, different results of laser marking image formation can be obtained simply by changing the control of laser irradiation without changing, or making an addition to, the configuration necessary for laser irradiation executed by the laser irradiation apparatus 1, and accordingly various printing results can be obtained. In addition, the results of the image formation can be made predictable prior to the execution of laser irradiation on the laser irradiation target, thereby obtaining an image formation result close to a desired result of the user.

In the foregoing embodiment, the target coloring state receiver 307 receives a designation instruction indicating that the position designated by the operator on the image shown by the printing target acquired by the data acquisition unit 305 is a laser irradiation position. Such configuration can easily set how to develop the color of the position in the image represented by the printing target data.

For instance, according to the laser irradiation instruction receiving process, the operator can operate the input unit 217 to simply set the number of laser irradiations at values different between each character image position im11 and a background image position im12 in the image shown by the printing target data, thereby making the hues of each character image position im11 and the background image position im12 different from each other. In addition, the hues of the plurality of character image portions im11 shown in FIG. 24 can be made different from one another by simply setting the number of laser irradiations for the character image portions im11 at different values.

In the foregoing embodiment, although the irradiation capability receiver 306 receives laser irradiation intensities and laser irradiation speeds as the laser irradiation capabilities, the laser irradiation capabilities can be laser irradiation intensities and laser irradiation densities. In this case, the images showing coloring states, composed of a group of images showing coloring states of the laser irradiation target, are stored in the HDD 214A, with respect to the combinations of laser intensities and laser irradiation densities. The display controller 302 displays the images showing coloring states (images im1, im2, im3) on the display unit 215. The target coloring state receiver 307 receives designations of a laser intensity, laser irradiation density, and the number of laser irradiations, which are associated with an image that is designated from the images showing coloring states by the operator. The instruction output unit 304 creates a laser irradiation execution instruction for executing the number of laser irradiations on each of the places designated by the operator at the designated laser intensity and laser irradiation density, and then outputs the laser irradiation execution instruction to the laser irradiation apparatus 1.

Figure 25:
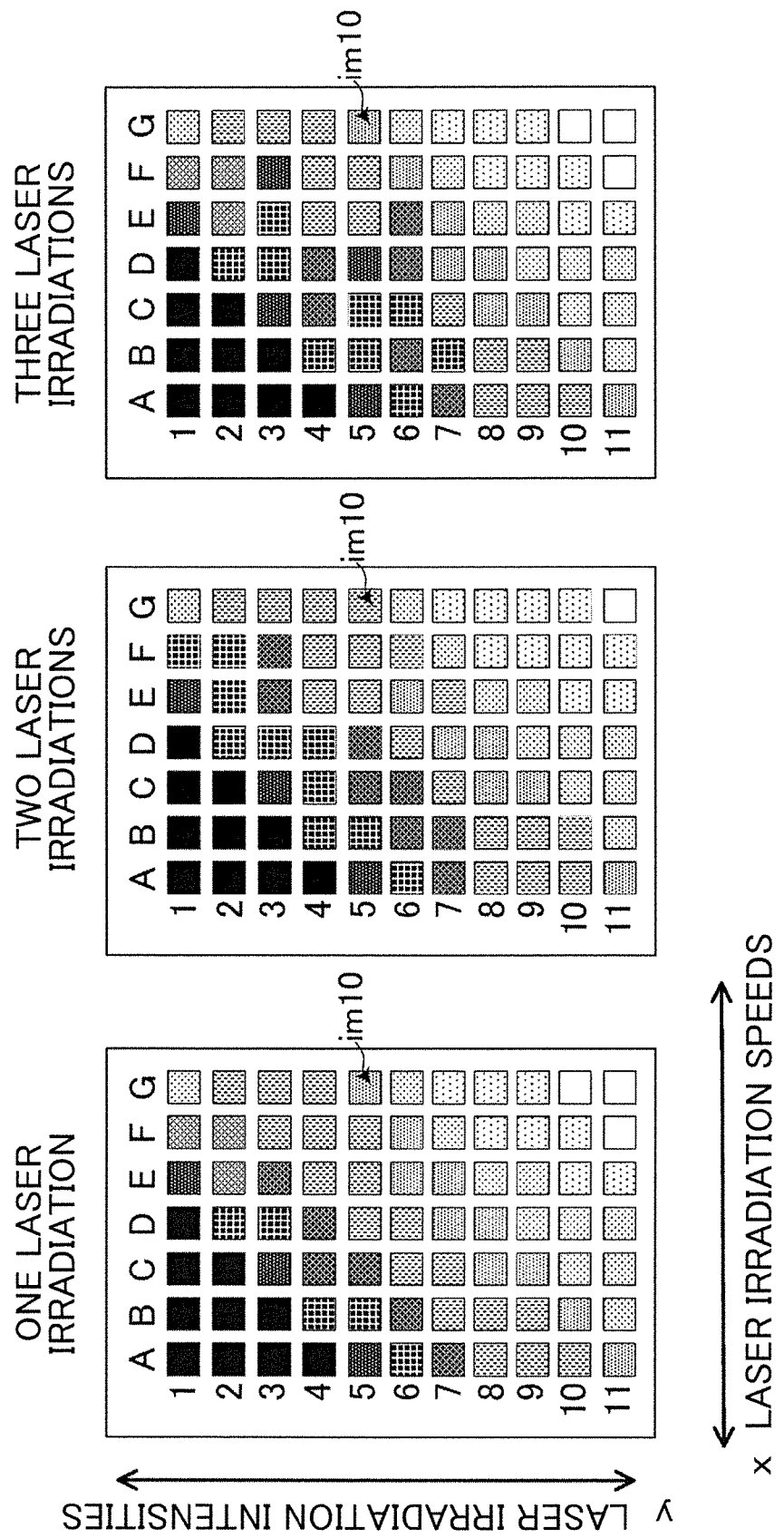
FIG. 25 is a diagram showing another example of a color developing image.

Another example of the color developing images stored in the HDD 214A is described next. FIG. 25 shows another example of the color developing image. The above has described an example of using a color developing image that is composed of the images that show the coloring states corresponding to the laser intensities and laser irradiation speeds on the basis of the number of laser irradiations; however, the present disclosure is not limited to this example. For instance, an image that has a matrix arrangement of color developing images showing the coloring states (referred to as "matrix image," hereinafter) corresponding to the combinations of laser intensities and laser irradiation speeds may be prepared on the basis of the number of laser irradiations and used as the color developing image.

For example, an image that respectively depict the specific images showing the coloring states obtained by laser irradiation executed on predetermined positions by means of the combinations of laser intensities and laser irradiation speeds, or, for example, the matrix images shown in FIG. 25 for example, are employed as the images showing coloring states. In each of these matrix images, images im10, respectively showing coloring states obtained by laser irradiations using the combinations of laser intensities and laser irradiation speeds, are arranged sequentially in the y-direction representing the laser irradiation intensities and in the x-direction representing the laser irradiation speeds, forming a matrix. These matrix images are prepared on the basis of the number of laser irradiations, as shown in FIG. 25. FIG. 25 shows three of these matrix images for three laser irradiations, i.e., one laser irradiation, two laser irradiations, and three laser irradiations.

For example, the operator operates the input unit 217 to input the matrix images to the information processing apparatus 2A from the computer or scanner through the communication interface 216. The controller 301 acquires the matrix images and stores them in the HDD 214A. In the target coloring state receiver 307 are stored the laser intensity, laser irradiation speed, and the number of laser irradiations corresponding to each of the images im10 included in the matrix images. The display controller 302 causes the display unit 215 to display the matrix images stored in the HDD 214A.

While the display unit 215 displays the matrix images, the operator operates the mouse pointer functioning as the input unit 217, to designate an image portion showing a desired coloring state on the matrix image corresponding to the desired number of laser irradiations. The target coloring state receiver 307 takes this operator's designation as a designation of the laser intensity, laser irradiation speed, and number of laser irradiations corresponding to an image showing the coloring state displayed by the designated portion. The instruction output unit 304 outputs, to the laser irradiation apparatus 1, a laser irradiation execution instruction corresponding to the designated laser intensity, laser irradiation speed, and number of laser irradiations received by the target coloring state receiver 307.

Another example is described. An image that respectively depict the specific images of the coloring states obtained by laser irradiation executed on predetermined positions by means of the combinations of laser intensities and laser irradiation densities may be employed as the images showing the coloring states. Gradation images shown in FIG. 26, for example, are employed.

In each of these gradation images, the specific images that show coloring states obtained by laser irradiations using the combinations of laser intensities and laser irradiation densities, are arranged on the basis of the laser irradiation intensities with respect to the gradually changing laser irradiation densities. These images are prepared on the basis of the number of laser irradiations.

Figure 26:
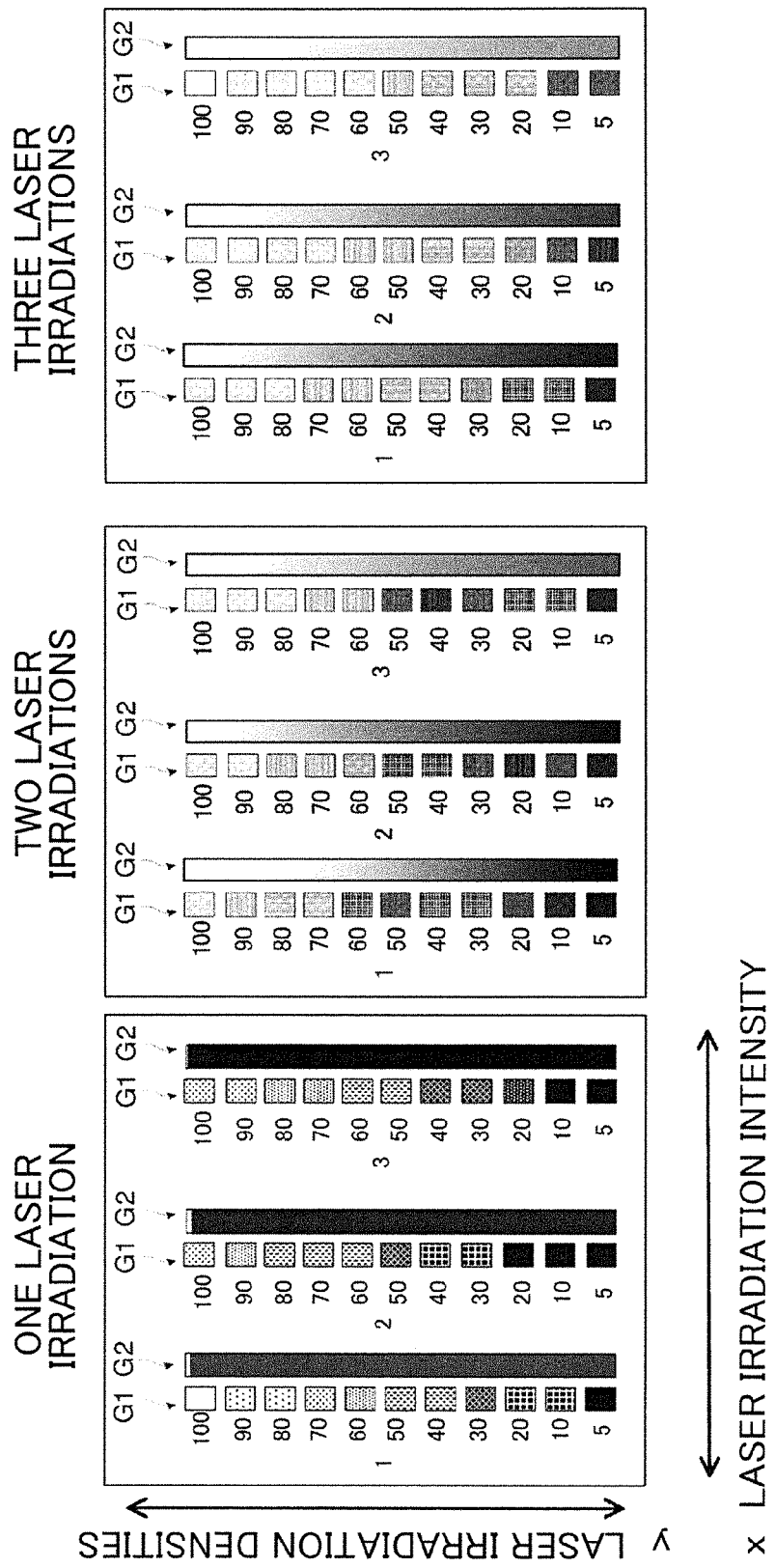
FIG. 26 is a diagram showing another example of the color developing image.

As shown in the images of "one laser irradiation," "two laser irradiations," and "three laser irradiations" in FIG. 26, images that show coloring states obtained at different laser irradiation densities are provided with gradation levels and arranged in rows. Within the scope of laser densities 5 to 100 that can be set by the laser irradiation apparatus 1, eleven levels of gradation images G1, i.e., 5, 10, 20, 30, 40, 50, 60, 70, 80, 90, and 100, are shown. Next to the images G1 is a strip of gradation-like image G2 that shows a coloring state that is obtained as a result of laser irradiation executed by converting the laser densities of 0 to 100 continuously in the range that can be set by the laser irradiation apparatus 1. Images that each have a combination of these gradation images G1 and G2 are shown along with images "1," "2" and "3" representing the levels of laser intensities.

In the target coloring state receiver 307 are stored laser intensities and laser irradiation densities corresponding to the respective images or portions contained in the gradation images. For example, in case of the predetermined gradation images, the positions of the images G1 therein are already determined. Therefore, the target coloring state receiver 307 has laser intensities and laser irradiation densities stored therein beforehand in correspondence with the areas representing the positions of the images G1 in the gradation images. As to the gradation-like images G2, the target coloring state receiver 307 has laser intensities and laser irradiation densities stored therein beforehand in correspondence with different positions in the long direction of each gradation-like image G2.

Let it assume that, while the display unit 215 displays the gradation images, the operator operates the mouse pointer functioning as the input unit 217, to designate an image portion showing a desired coloring state in a gradation image corresponding to the desired number of laser irradiations. In this case, the target coloring state receiver 307 receives a designation of a laser intensity, a laser irradiation density, and the number of laser irradiations that correspond to an image showing the coloring state displayed by the portion. The instruction output unit 304 outputs, to the laser irradiation apparatus 1, a laser irradiation execution instruction corresponding to the designated laser intensity, laser irradiation density, and number of laser irradiations received by the target coloring state receiver 307.

Let it assume here that, while the gradation images are displayed by the display unit 215, the operator operates the input unit 217 to designate a part of the areas in the gradation images and thereby input the corresponding laser intensity and laser irradiation density. In this case, the target coloring state receiver 307 may store therein the input laser intensity and laser irradiation density in correspondence with the image displayed in the designated part of the areas (any of the respective images in the gradation image). In this manner, the operator can set laser intensities and laser irradiation densities in accordance with the performance of the laser irradiation apparatus.

The result of laser marking image formation shows that image reproducibility largely depends on the laser irradiation intensities, irradiation speeds, and irradiation densities. However, preparing such color developing images enables easy prediction of a printing result such as chromogenic properties caused by laser irradiation with respect to each laser irradiation, without actually executing the laser irradiation.

<Explanation of Embodiments of Laser Irradiation Apparatus>

Figure 27:
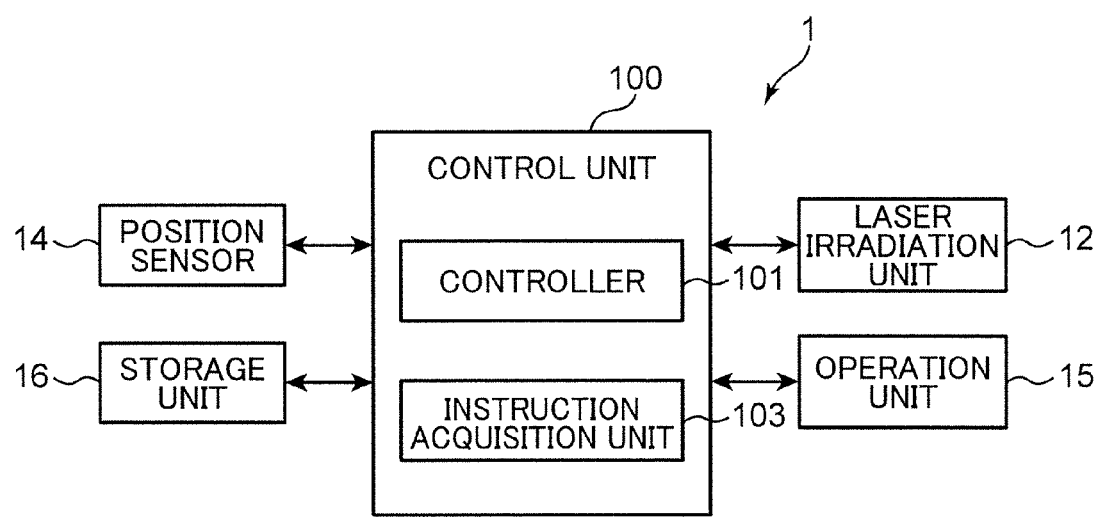
FIG. 27 is a block diagram schematically showing an electrical configuration of the laser irradiation apparatus.
Figure 28A:
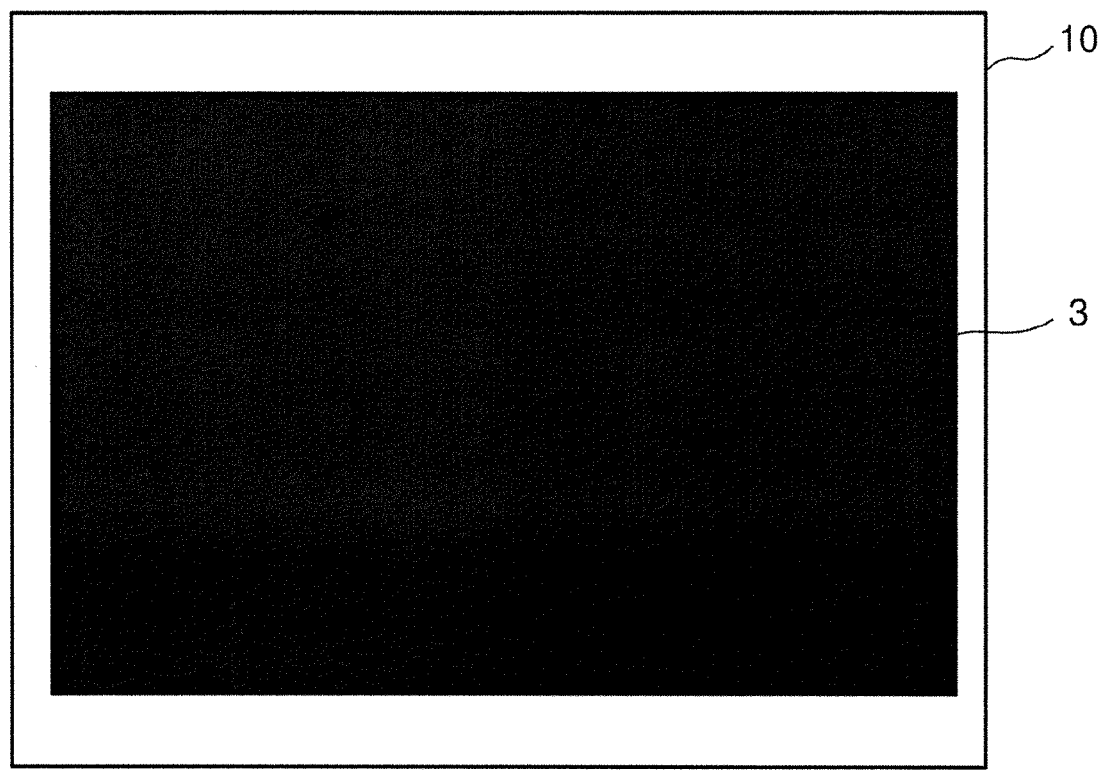
FIG. 28A is a plan view showing an example of a packaging material used as an irradiation target.
Figure 28B:
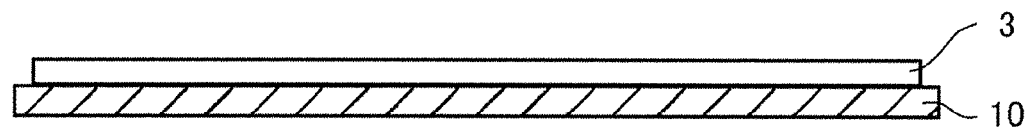
FIG. 28B is a side view showing an example of the packaging material used as the irradiation target.
Figure 29:
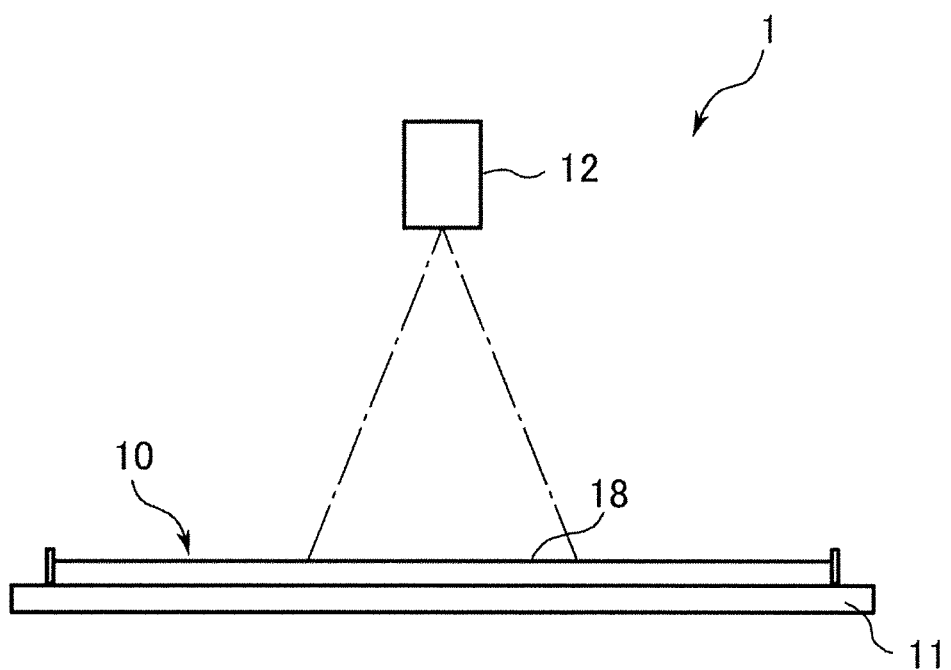
FIG. 29 is a diagram showing a part of the laser irradiation apparatus and the irradiation target thereof from the side.

A configuration of the laser irradiation apparatus 1 is described next. FIG. 27 is a block diagram schematically showing an electrical configuration of the laser irradiation apparatus 1. FIG. 28A is a plan view showing an example of a packaging material used as the irradiation target. FIG. 28B is a side view showing an example of the packaging material used as the irradiation target. FIG. 29 is a diagram showing a part of the laser irradiation apparatus 1 and the irradiation target thereof from the side.

The laser irradiation apparatus 1 is operated based on instructions provided by the information processing apparatus 2, 2A according to the first, second or third embodiment. In other words, in accordance with the laser irradiation execution instructions output from the information processing apparatus 2, 2A, the controller 101 of a control unit 100 of the laser irradiation apparatus 1 controls the laser irradiation unit 12 to execute laser marking to form an image on a front surface of a packaging material 10 of printing ink formed as a ground layer on the front surface.

The packaging material 10 is made of, for example, a cardboard material, a heavy paper material, a synthetic resin material, or the like. In the present embodiment, the packaging material 10 made of a cardboard material is described. As shown in FIGS. 28A and 28B, for example, the packaging material 10 has a ground layer 3 formed by solid coating of printing ink on a portion of the front surface to be printed. This portion to be printed is a portion where laser marking image formation is performed by laser irradiation by the laser irradiation apparatus 1.

The laser irradiation apparatus 1 is now described. The laser irradiation apparatus 1 has the control unit 100, a support base 11, the laser irradiation unit 12, a position sensor 14, an operation unit 15, and a storage unit 16 (irradiation step storage unit). The support base 11 is a placement base for positioning and supporting the packaging material 10 with respect to the laser irradiation unit 12.

The laser irradiation unit 12 injects a laser beam onto the front surface of the packaging material 10 supported on the support base 11. The laser irradiation unit 12 is placed fixedly above the packaging material 10 on the support base 11 in such a manner as to face the packaging material 10. The laser beam irradiated by the laser irradiation unit 12 onto the ground layer 3 on the front surface of the packaging material 10 causes chemical changes in the laser-irradiation portion of the ground layer 3.

The laser irradiation unit 12 irradiates an infrared area laser such as, for example, a carbon dioxide laser ($CO_2$ laser), wherein the laser has a wavelength of 10.6 μm and an output of 30 W. Note that the laser irradiation unit 12 can irradiate another laser such as, for example, a YAG laser. The YAG laser is irradiated at a wavelength of 1.064 μm and an output of 30 W.

The range where laser irradiation can be executed at once with the laser irradiation unit 12 without moving the laser irradiation unit 12 is a constant range of, for example, 300 mm×300 mm. When irradiating this irradiation range with a laser, the laser irradiation unit 12 scans the irradiation range with a laser beam in a certain direction. With the information processing apparatus 2 of the first embodiment, the laser irradiation unit 12 can irradiate a laser with at least the laser intensity and laser irradiation density being variable. Note in the embodiments for executing the laser irradiation instruction receiving process using the gradation images shown in FIGS. 9 and 10, that the laser irradiation unit 12 can perform laser irradiation with the laser diameter being variable in addition to the laser intensity and laser irradiation density. The laser irradiation unit 12 controls laser irradiation in the certain scanning direction in accordance with, for example, the laser intensity and laser irradiation density indicated by the laser irradiation execution instruction.

Next, with the information processing apparatus 2 of the second embodiment, the laser irradiation unit 12 can perform laser irradiation with at least the laser intensity and laser irradiation speed being variable. In the embodiments for executing the laser irradiation instruction receiving process using the matrix images shown in FIGS. 17 and 18, the laser irradiation unit 12 can perform laser irradiation with the laser diameter being variable in addition to the laser intensity and laser irradiation speeds.

When employing the information processing apparatus 2A of the third embodiment, the laser irradiation unit 12 is adopted depending on the conditions as described in the first and second embodiments respectively.

The operation unit 15 has a key or a display unit such as a liquid crystal display (LCD) with a touch panel function operated by the operator, and receives various instructions from the operator operating the key or display unit. The operation unit 15 outputs the contents of the received instructions to the controller 101.

The control unit 100 is configured with a CPU and the like and includes the controller 101, and an instruction acquisition unit 103. The controller 101 is in charge of overall operational control of the laser irradiation apparatus 1. Particularly, the controller 101 drives and controls laser irradiation performed by the laser irradiation unit 12. The controller 101 is an example of the drive controller according to the scope of claims. The instruction acquisition unit 103 acquires the laser irradiation execution instruction from the information processing apparatus 2 through an interface, not shown.

Note that the laser irradiation apparatus 1 has an information processing apparatus having the similar configuration as the information processing apparatus 2, and is formed in a configuration where the laser irradiation apparatus 1 alone executes the process of receiving a laser irradiation instruction from the operator and performs laser irradiation. For example, the laser irradiation apparatus 1 is configured to have the information processing apparatus 2.

Laser irradiation control performed by the laser irradiation apparatus 1 is described next. First, laser irradiation control for gradation image formation illustrated in the first embodiment is described. Let it assume that a laser irradiation program for forming the gradation images described above by means of laser marking is further stored beforehand in the storage unit 16.

In accordance with the laser irradiation program, the controller 101 performs laser irradiation control for forming the gradation images by laser marking. In the laser irradiation program are stored beforehand combinations of a plurality of predetermined laser intensities and laser irradiation densities (second combinations), and the controller 101 performs laser irradiation based on each of the combinations. The laser irradiation program operates the controller 101 in such a manner that the laser irradiation unit 12 performs laser irradiation on each of the areas arranged in a gradation manner (e.g., the positions of the gradation images G1 shown in FIG. 3), based on each of the combinations. In other words, the controller 101 drives and controls the laser irradiation unit 12 in accordance with the laser irradiation program, as shown in FIG. 3, to form and arrange a plurality of images representing the laser irradiation densities in a vertical direction and form images representing the laser intensities adjacent thereto. The controller 101 forms a plurality of these images on the basis of the laser intensities.

The laser irradiation apparatus 1, therefore, can form the foregoing gradation images by performing the operations in accordance with the laser irradiation program. The operator can use the gradation images in the laser irradiation instruction receiving process by reading an image of the irradiation target having the gradation images by means of a scanner or the like and loading it onto the information processing apparatus 2 through the communication interface 216.

Note that another configuration can be employed in which the laser irradiation program is stored in the HDD 214 of the information processing apparatus 2, and the control unit 200 is operated according to the laser irradiation program so that an operation control instruction is sent to the laser irradiation apparatus 1 to cause the laser irradiation apparatus 1 to perform the gradation image formation. In addition, the laser irradiation apparatus 1 may include the information processing apparatus 2.

It is preferred that the images that are composed of a group of specific images showing the coloring states of the laser irradiation target corresponding to the combinations of laser intensities and laser irradiation densities, as shown in FIG. 3, be the gradation images; however, the present disclosure is not limited to this configuration, and therefore the images showing the coloring states may be positioned in a different arrangement.

When the matrix images described in the second embodiment are formed by means of laser marking as described above, the controller 101 executes laser irradiation control for forming the matrix images by means of laser marking in accordance with a laser irradiation program for matrix image formation. In such a laser irradiation program are stored combinations of a plurality of predetermined laser intensities and laser irradiation speeds (first combinations), and the controller 101 performs laser irradiation based on each of the combinations. The laser irradiation program operates the controller 101 in such a manner that the laser irradiation unit 12 performs laser irradiation on each of the areas arranged in a matrix (e.g., the positions of the images im03 shown in FIG. 11), based on each of the combinations. In other words, the controller 101 drives and controls the laser irradiation unit 12 in accordance with the laser irradiation program, as shown in FIG. 11, to form images of the values of the laser intensities in a vertical direction and form a plurality of images showing the laser irradiation speeds in a horizontal direction.

The controller 101 performs laser irradiation control for forming the color developing images by means of laser marking in accordance with the laser irradiation program. In the laser irradiation program are stored the combinations of the predetermined laser intensities and laser irradiation speeds and different numbers of laser irradiations associated therewith, and the controller 101 is caused to execute laser irradiation based on each of the combinations. The controller 101 is an example of the drive controller according to the scope of claims.

When the information processing apparatus 2A of the third embodiment is employed, the laser irradiation program stores combinations of different numbers of laser irradiations and predetermined laser intensities and laser irradiation densities (or laser intensities and laser irradiation speeds), and the controller 101 is caused to execute laser irradiation based on each of the combinations.

The laser irradiation program operates the controller 101 in such a manner that the laser irradiation unit 12 performs laser irradiation on the position of the image im1 shown in FIG. 20 configuring the color developing image, based on each of the combinations. In other words, the controller 101 drives and controls the laser irradiation unit 12 in accordance with the laser irradiation program, to arrange images in order of laser irradiation reception numbers thereof in a certain direction as shown in FIG. 20 and form an image showing the corresponding laser irradiation numbers next to these images.

The above has described the preferred embodiments of the present disclosure with reference to the accompanying drawings; however, the present disclosure is not limited to these embodiments. The shapes, combinations and the like of the configurations illustrated in the foregoing embodiments are merely exemplary but can be changed in various ways based on design requirements and the like within the scope of the present disclosure.

For example, the foregoing embodiments have described that the irradiation target is the packaging material 10 made of cardboard, but the laser irradiation apparatus 1 can execute laser irradiation on an object made of a different material.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An information processing apparatus, comprising:
a display unit;
a storage unit for storing coloring states of a laser irradiation target obtained when laser irradiation is executed under a plurality of conditions for laser irradiation executed by a laser irradiation apparatus, the storing being executed with respect to combinations of the plurality of conditions;
a display controller for causing the display unit to display the coloring states stored in the storage unit with respect to the combinations of the plurality of conditions;
an instruction receiver for receiving, from an operator, a designation instruction for designating any of display portions of the coloring states displayed on the display unit; and
an instruction output unit for outputting, to the laser irradiation apparatus, a laser irradiation execution instruction for executing laser irradiation as a laser irradiation execution instruction corresponding to the display portion, the designation instruction of which is received by the instruction receiver, in line with the plurality of conditions.

2. The information processing apparatus according to claim 1, wherein
the storage unit stores, as the plurality of conditions and with respect to combinations of laser intensities and laser irradiation densities used for the laser irradiation, the coloring states of the laser irradiation target on which laser irradiation is executed at laser intensity and laser irradiation density,
the display controller causes the display unit to display the coloring states with respect to the combinations of laser intensities and laser irradiation densities, and
the instruction output unit outputs, to the laser irradiation apparatus, a laser irradiation execution instruction in line with the laser intensities and laser irradiation densities as the laser irradiation execution instruction.

3. The information processing apparatus according to claim 2, wherein
the display controller causes the display unit to display the coloring states with respect to the combinations of laser intensities and laser irradiation densities in the form of a gradation in which the laser irradiation densities are arranged in a gradually changing manner on the basis of the laser intensities.

4. The information processing apparatus according to claim 2, wherein
the storage unit stores the coloring states with respect to the combinations of laser intensities and laser irradiation densities on the basis of laser diameters in laser irradiation by the laser irradiation apparatus.

5. The information processing apparatus according to claim 2, wherein
the storage unit stores the coloring states with respect to at least the combinations of laser intensities and laser irradiation densities on the basis of a material of a target of the laser irradiation.

6. The information processing apparatus according to claim 1, wherein
the storage unit stores, as the plurality of conditions and with respect to combinations of laser intensities and laser irradiation speeds used for the laser irradiation, the coloring states of the laser irradiation target on which the laser irradiation is executed at the laser intensities and laser irradiation speeds,
the display controller causes the display unit to display the coloring states with respect to the combinations of laser intensities and laser irradiation speeds, and
the instruction output unit outputs, to the laser irradiation apparatus, a laser irradiation execution instruction in line with the laser intensities and laser irradiation speeds as the laser irradiation execution instruction.

7. The information processing apparatus according to claim 6, wherein
the storage unit stores the coloring states with respect to the combinations of laser intensities and laser irradiation speeds on the basis of laser diameters in laser irradiation by the laser irradiation apparatus.

8. The information processing apparatus according to claim 6, wherein
the storage unit stores the coloring states with respect to at least the combinations of laser intensities and laser irradiation speeds on the basis of a material of a target of the laser irradiation.

9. The information processing apparatus according to claim 1, wherein
the storage unit stores, as the plurality of conditions, the coloring states of the laser irradiation target with respect to combinations of conditions for a laser irradiation capacity and the number of laser irradiations,
the display controller causes the display unit to display the coloring states on the basis of the number of laser irradiations, and
the instruction output unit outputs, to the laser irradiation apparatus, a laser irradiation execution instruction in line with the conditions for a laser irradiation capacity and the number of laser irradiations as the laser irradiation execution instruction.

10. The information processing apparatus according to claim 9, wherein
the conditions for a laser irradiation capacity are a laser intensity and a laser irradiation speed which are used for laser irradiation by the laser irradiation apparatus,
the storage unit stores, with respect to the combinations of laser intensities and laser irradiation speeds, the coloring states of the laser irradiation target obtained by laser irradiation at the laser intensities and laser irradiation speeds on the basis of the number of laser irradiations executed by the laser irradiation apparatus, the display controller causes the display unit to display the coloring states stored in the storage unit with respect to the combinations of laser intensities and laser irradiation speeds stored on the basis of the number of laser irradiations, and the instruction output unit outputs, to the laser irradiation apparatus, a laser irradiation execution instruction in line with the laser intensities, the laser irradiation speeds, and the number of laser irradiations, as the laser irradiation instruction.

11. The information processing apparatus according to claim 9, wherein the conditions for a laser irradiation capacity are a laser intensity and a laser irradiation density which are used for laser irradiation by the laser irradiation apparatus, the storage unit stores, with respect to the combinations of laser intensities and laser irradiation densities, the coloring states of the laser irradiation target obtained by laser irradiation at the laser intensities and laser irradiation densities on the basis of the number of laser irradiations executed by the laser irradiation apparatus, the display controller causes the display unit to display the coloring states stored in the storage unit with respect to the combinations of laser intensities and laser irradiation densities stored on the basis of the number of laser irradiations, and the instruction output unit outputs, to the laser irradiation apparatus, a laser irradiation execution instruction in line with the laser intensities, the laser irradiation densities, and the number of laser irradiations, as the laser irradiation instruction.

12. The information processing apparatus according to claim 1, wherein the instruction receiver receives the designation instruction in association with a laser irradiation position where the laser irradiation is executed on the target by the laser irradiation apparatus.

13. The information processing apparatus according to claim 12, further comprising:

a data acquisition unit for acquiring image data, wherein the instruction receiver receives the designation instruction by defining a position, designated by the operator, on an image showing the image data acquired by the instruction receiver, as the laser irradiation position.

14. The information processing apparatus according to claim 13, wherein based on the designation instruction associated with the laser irradiation position and received by the instruction receiver and each of the coloring states stored in the storage unit, the display controller causes the display unit to display, in accordance with the image data, a coloring state obtained when the laser irradiation is executed based on a content described by the designation instruction.

15. A laser irradiation apparatus, comprising:

a laser irradiation unit;

an irradiation step storage unit for storing first combinations of a plurality of predetermined laser intensities and laser irradiation speeds used for laser irradiation by the laser irradiation unit, second combinations of a plurality of predetermined laser intensities and laser irradiation densities, or combinations of the first or second combinations and the number of laser irradiation executed by the laser irradiation unit; and a drive controller for causing the laser irradiation unit to execute laser irradiation on a predetermined position in an irradiation target with respect to each of the first or second combinations stored in the irradiation step storage unit or each of the first or second combinations stored on the basis of the number of laser irradiations.

* * * * *